(12) United States Patent
Yamanaka

(10) Patent No.: US 8,080,958 B2
(45) Date of Patent: Dec. 20, 2011

(54) POWER CONVERSION DEVICE

(75) Inventor: Katsutoshi Yamanaka, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 168 days.

(21) Appl. No.: 12/553,986

(22) Filed: Sep. 4, 2009

(65) Prior Publication Data

US 2009/0322276 A1 Dec. 31, 2009

Related U.S. Application Data

(63) Continuation of application No. PCT/JP2008/052490, filed on Feb. 15, 2008.

(30) Foreign Application Priority Data

Mar. 7, 2007 (JP) .................................. 2007-057292

(51) Int. Cl.
H02M 5/293 (2006.01)
(52) U.S. Cl. ...................... 318/400.26; 363/74; 363/163; 318/448; 318/459
(58) Field of Classification Search ............. 318/400.24, 318/400.26, 375, 376, 445, 448, 459; 363/74, 363/123, 124, 159, 163, 164
See application file for complete search history.

(56) References Cited

U.S. PATENT DOCUMENTS

| 4,833,588 A * | 5/1989 | Schauder | 363/159 |
| 5,949,672 A * | 9/1999 | Bernet | 363/159 |
| 6,603,647 B2 * | 8/2003 | Briesen et al. | 361/91.1 |
| 6,704,215 B2 * | 3/2004 | Simon | 363/159 |

FOREIGN PATENT DOCUMENTS

| JP | 2005-020799 | 1/2005 |
| JP | 2005-348479 | 12/2005 |
| JP | 2006-320070 | 11/2006 |
| JP | 2007-57292 A * | 8/2007 |

* cited by examiner

*Primary Examiner* — Bentsu Ro
(74) *Attorney, Agent, or Firm* — Ditthavong Mori & Steiner, P.C.

(57) ABSTRACT

A power conversion device includes a main circuit that has switches connecting each phase of a three-phase AC power supply to each output phase, an LC filter having a reactor and a capacitor connected between the three-phase AC power supply and each bidirectional switch, and a current detector detecting an input current or a load current, and a four-step commutation device generating four steps on the basis of the polarity of the load current. The four-step commutation device sets times between the steps to a value more than zero so as to inhibit open circuit between output phases and short circuit between power supply phases, and sets the times between the steps in accordance with the polarity of the load current so as to cancel a distortion of an output voltage due to four-step commutation during a PWM cycle.

12 Claims, 13 Drawing Sheets

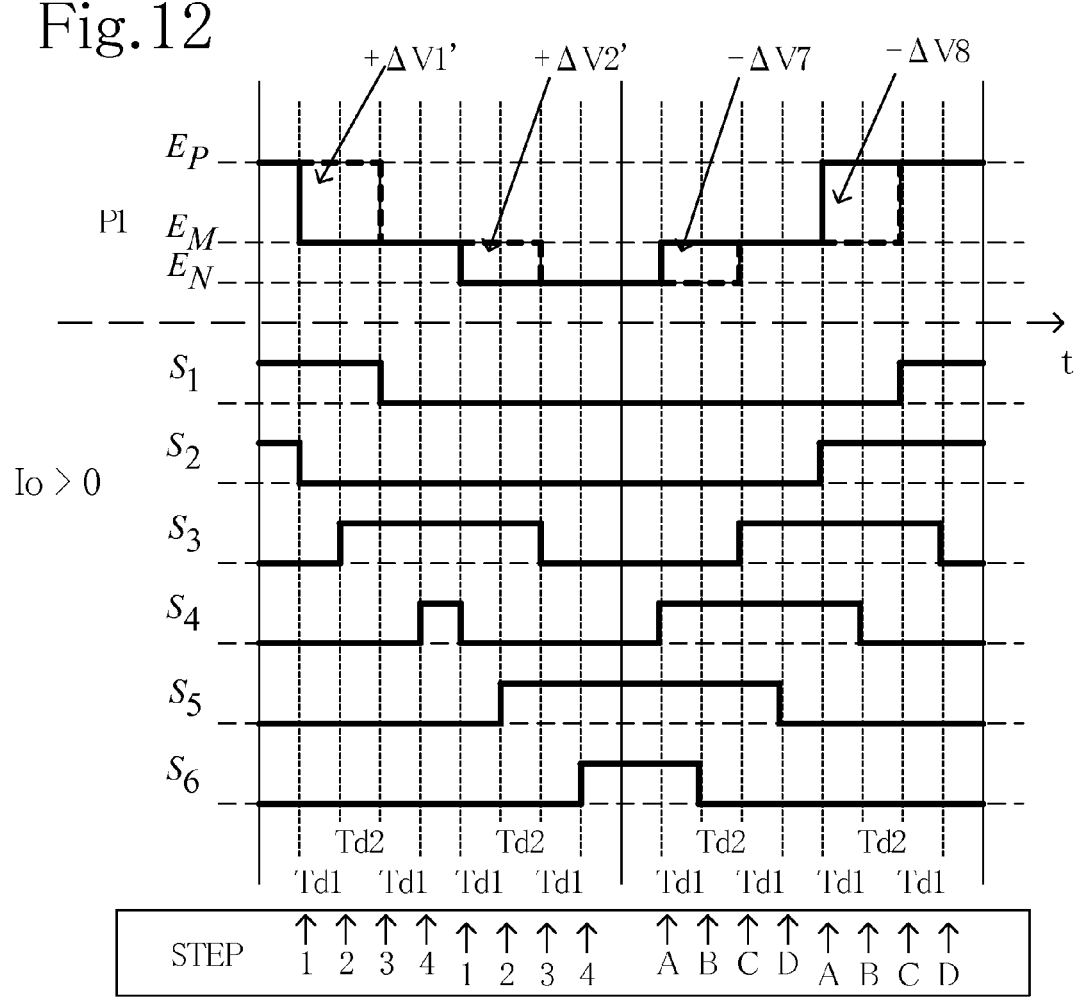

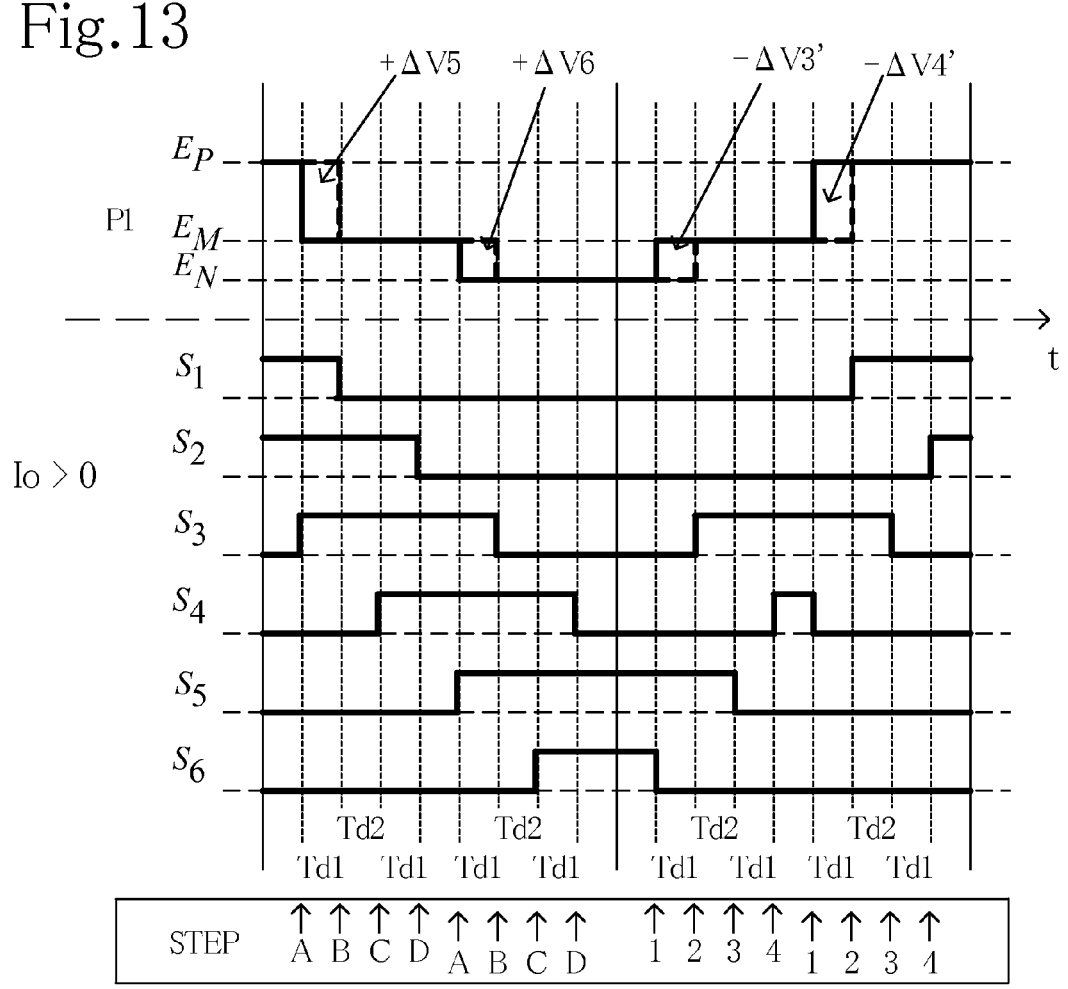

POWER CONVERSION DEVICE

CROSS-REFERENCE TO RELATED APPLICATION

The present application is related to PCT patent application Ser. No. PCT/JP2008/052490 titled "Power Conversion Device", and to Japanese Patent application no. 2007-057292 filed at Japan Patent Office titled "Power Conversion Device", all of which are incorporated herein by reference.

BACKGROUND OF THE INVENTION

1. Field of the Invention

The present invention relates to a power conversion device that directly generates an arbitrary frequency from an AC power supply.

2. Description of Related Art

A direct AC power conversion device connects each phase of an AC power supply to each phase on an output side through a bidirectional switch, and directly converts the AC power supply into arbitrary voltage and frequency.

The direct AC power conversion device requires a unique switching operation in order to forcibly switch a current flowing to the switch. The switching operation will be hereinafter referred to as commutation.

Examples of a method of generating commutation include a method of generating commutation on the basis of an output current direction signal obtained by an output current direction detection circuit and the like. The commutation is generated in a logic circuit on the basis of a PWM signal. The commutation performs a switching operation so as to be delayed by a switching time of a semiconductor device serving as a switch.

For this reason, an error is generated between a voltage command of an output voltage which is to be originally output and an output voltage which is actually output. This error depends on the state of a power supply, the direction of an output current, the magnifitude relation of a power supply voltage, and the like.

With respect to such a technical problem, a correction method is suggested which detects the direction of a current or the state of a voltage in advance, and corrects a command voltage to correct the error in the output voltage.

For example, JP-A-2005-348479 discloses that an error due to four-step commutation is avoided by previous correction to a command and by reduction of the number of commutation steps around zero.

SUMMARY OF THE INVENTION

According to an aspect of the invention, there is provided a power conversion device that receives a three-phase AC power supply as an input and controls an output voltage in accordance with a voltage command by PWM so as to supply power to a load including a motor. The power conversion device includes a main circuit section and a four step commutation device. The main circuit section includes forward and backward switches, an LC filter and a current detector. The forward and backward switches connect each phase of the three-phase AC power supply to each output phase connected to the load. The LC filter has a reactor and a capacitor and is connected between the three-phase AC power supply and each of the forward and backward switches. The current detector detects an input current or a load current. The four-step commutation device generates a plurality of steps on a basis of a polarity of the load current. The plurality of steps include a step1, a step2, a step3 and a step4. In the step 1, a switch at a commutation source among the forward and backward switches having a polarity opposite to the polarity of the load current is turned off. In the step 2, a switch at a commutation destination among the forward and backward switches having a polarity same as the polarity of the load current is turned on. In the step 3, a switch at the commutation source among the forward and backward switches having a polarity same as the polarity of the load current is turned off. In the step 4, a switch at the commutation destination among the forward and backward switches having a polarity opposite to the polarity of the load current is turned on. The four-step commutation device performs commutation in a sequence of the step 1, the step 2, the step 3, and the step 4. Times between each of the plurality of steps during a half PWM cycle for commutation from a high potential power supply phase to a low potential power supply phase are set to Td1, Td2, and Td3 in sequence. Times between each of the plurality of steps during a half PWM cycle for commutation from the low potential power supply phase to the high potential power supply phase are set to Td3', Td2', and Td1' in sequence. At least of one of Td1, Td2, Td3' and Td2' is differently set between when the load current flows from the three-phase AC power supply to the load and when the load current flows from the load to the three-phase AC power supply.

According to an another aspect of the invention, there is provided a power conversion device that receives a three-phase AC power supply as an input and controls an output voltage in accordance with a voltage command by PWM so as to supply power to a load including a motor. The power conversion device includes a main circuit section and a four-step commutation device. The main circuit section has forward and backward switches, an LC filter and a current detector. The forward and backward switches connect each phase of the three-phase AC power supply to each output phase connected to the load. The LC filter has a reactor and a capacitor and is connected between the three-phase AC power supply and each of the forward and backward switches. The current detector detects an input current or a load current. The four-step commutation device generates a plurality of steps on a basis of an interphase voltage of the three-phase AC power supply. The plurality of steps include a step A, a step B, a step C and a step D. In the step A, a switch at a commutation destination among the forward and backward switches to be backward biased by an interphase voltage is turned on. In the step B, a switch at a commutation source among the forward and backward switches to be forward biased by an interphase voltage is turned off. In the step C, a switch at the commutation destination among the forward and backward switches to be forward biased by the interphase voltage is turned on. In the step D a switch at the commutation source among the forward and backward switches to be backward biased by the interphase voltage is turned off. The four-step commutation device performs commutation in a sequence of the step A, the step B, the step C, and the step D. Times between each of the plurality of steps during a half PWM cycle for commutation from a high potential power supply phase to a low potential power supply phase are set to Td1, Td2, and Td3 in sequence. Times between each of the plurality of steps during a half PWM cycle for commutation from the low potential power supply phase to the high potential power supply phase are set to Td3', Td2', and Td1' in sequence. At least of one of Td1, Td2, Td3' and Td2' is differently set between when the load current flows from the three-phase AC power supply to the load and when the load current flows from the load to the three-phase AC power supply.

According to still another aspect of the invention, there is provided a power conversion device that receives a three-phase AC power supply as an input and controls an output voltage in accordance with a voltage command by PWM so as to supply power to a load including a motor. The power conversion device includes a main circuit section, a first four-step commutation device and a second four-step commutation device. The main circuit section has forward and backward switches, an LC filter and a current detector. The forward and backward switches connect each phase of the three-phase AC power supply to each output phase connected to the load. The LC filter has a reactor and a capacitor and is connected between the three-phase AC power supply and each of the forward and backward switches. The current detector detects an input current or a load current. The first four-step commutation device generates a first plurality of steps on a basis of an interphase voltage of the three-phase AC power supply. The first plurality of steps include a step A, a step B, a step C and a step D. In the step A, a switch at a commutation destination among the forward and backward switches to be backward biased by an interphase voltage is turned on. In the step B, a switch at a commutation source among the forward and backward switches to be forward biased by an interphase voltage is turned off. In the step C, a switch at the commutation destination among the forward and backward switches to be forward biased by the interphase voltage is turned on. In the step D, a switch at the commutation source among the forward and backward switches to be backward biased by the interphase voltage is turned off. The second four-step commutation device generates a first plurality of steps on a basis of a polarity of the load current. The second plurality of steps include a step 1, a step 2, a step 3 and a step 4. In the step 1 a switch at the commutation source among the forward and backward switches having a polarity opposite to the polarity of the load current is turned off. In the step 2 a switch at the commutation destination among the forward and backward switches having a polarity same as the polarity of the load current is turned on. In the step 3 a switch at the commutation source among the forward and backward switches having a polarity same as the polarity of the load current is turned off. In the step 4 a switch at the commutation destination among the forward and backward switches having a polarity opposite to the polarity of the load current is turned on. The first four-step commutation device performs commutation in a sequence of the step A, the step B, the step C, and the step D. The second four-step commutation device performs commutation in a sequence of the step 1, the step 2, the step 3, and the step 4. The first four-step commutation device and the second four-step commutation device are switched to each other in a half PWM cycle.

BRIEF DESCRIPTION OF THE DRAWINGS

Exemplary embodiments of the present invention will be described in detail based on the following figures, wherein:

FIG. 12 is a diagram showing an example of a PWM pulse waveform of a four-step commutation operation in a power conversion device according to an tenth embodiment of the invention (Io>0);

FIG. 13 is a diagram showing an another example of a PWM pulse waveform of a four-step commutation operation in a power conversion device according to an tenth embodiment of the invention (Io>0);

DETAILED DESCRIPTION OF THE PREFERRED EMBODIMENTS

Hereinafter, embodiments of the invention will be described with reference to the drawings.

Figure 1:
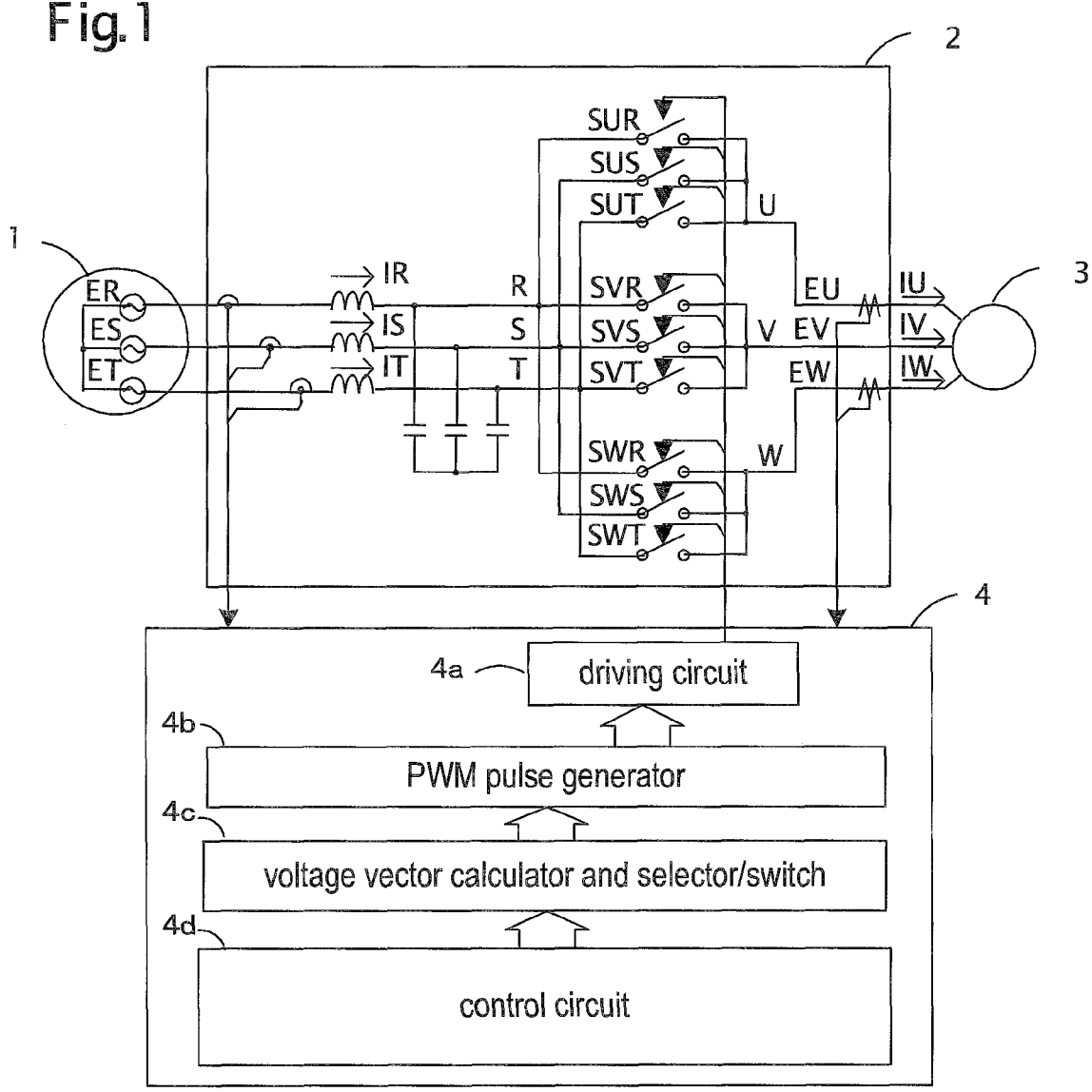
FIG. 1 is a block diagram showing the configuration of a power conversion device according to a first embodiment of the invention.

FIG. 1 is a block diagram showing the configuration of a power conversion device according to a first embodiment of the invention. Referring to FIG. 1, the power conversion device according to the first embodiment of the invention includes a main circuit 2 of a direct power conversion device and a controller 4. The power conversion device according to the first embodiment of the invention receives a three-phase power supply 1 as an input and drives a load 3 such as a motor or the like. The controller 4 functions as a four-step commutation device. In other words, the power conversion device according to the first embodiment of the invention includes a main circuit 2 of a direct power conversion device and a four-step commutation device.

The controller 4 includes a control circuit 4d serving as a voltage command generator, a voltage vector calculator and selector/switch 4c, a PWM pulse generator 4b, and a driving circuit 4a.

In the power conversion device according to the first embodiment of the invention, the switch configuration includes a bidirectional switch SUR connecting a U phase to an R phase, a bidirectional switch SUS connecting the U phase to an S phase, a bidirectional switch SUT connecting the U phase to a T phase, a bidirectional switch SVR connecting a V phase to the R phase, a bidirectional switch SVS connecting the V phase to the S phase, a bidirectional switch SVT connecting the V phase to the T phase, a bidirectional switch SWR connecting the W phase to the R phase, a bidirectional switch SWS connecting the W phase to the S phase, and a bidirectional switch SWT connecting the W phase to the T phase.

The power conversion device according to the first embodiment of the invention includes an LC filter having a reactor and a capacitor in an input line of the three-phase power supply 1.

Figure 2:
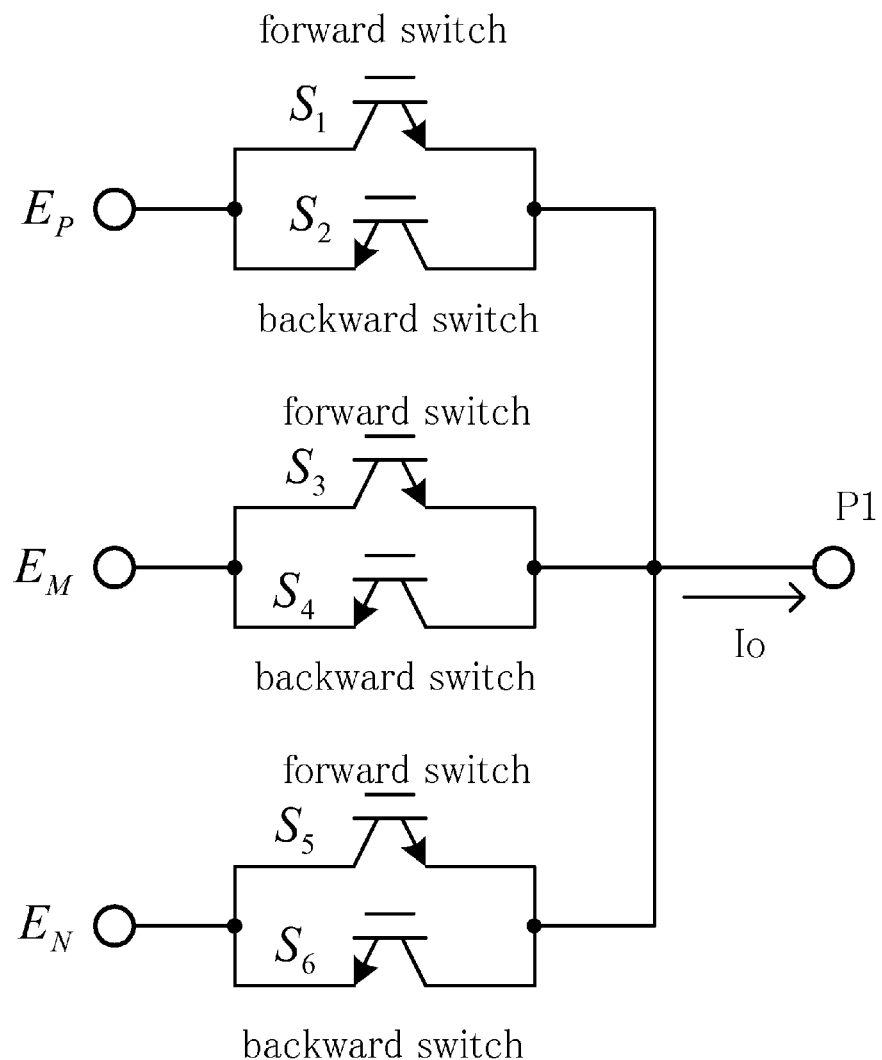
FIG. 2 is a diagram showing an example of a switch configuration in the power conversion device according to the first embodiment of the invention.

FIG. 2 is a diagram showing an example of a switch configuration in the power conversion device according to the first embodiment of the invention.

Figure 3:
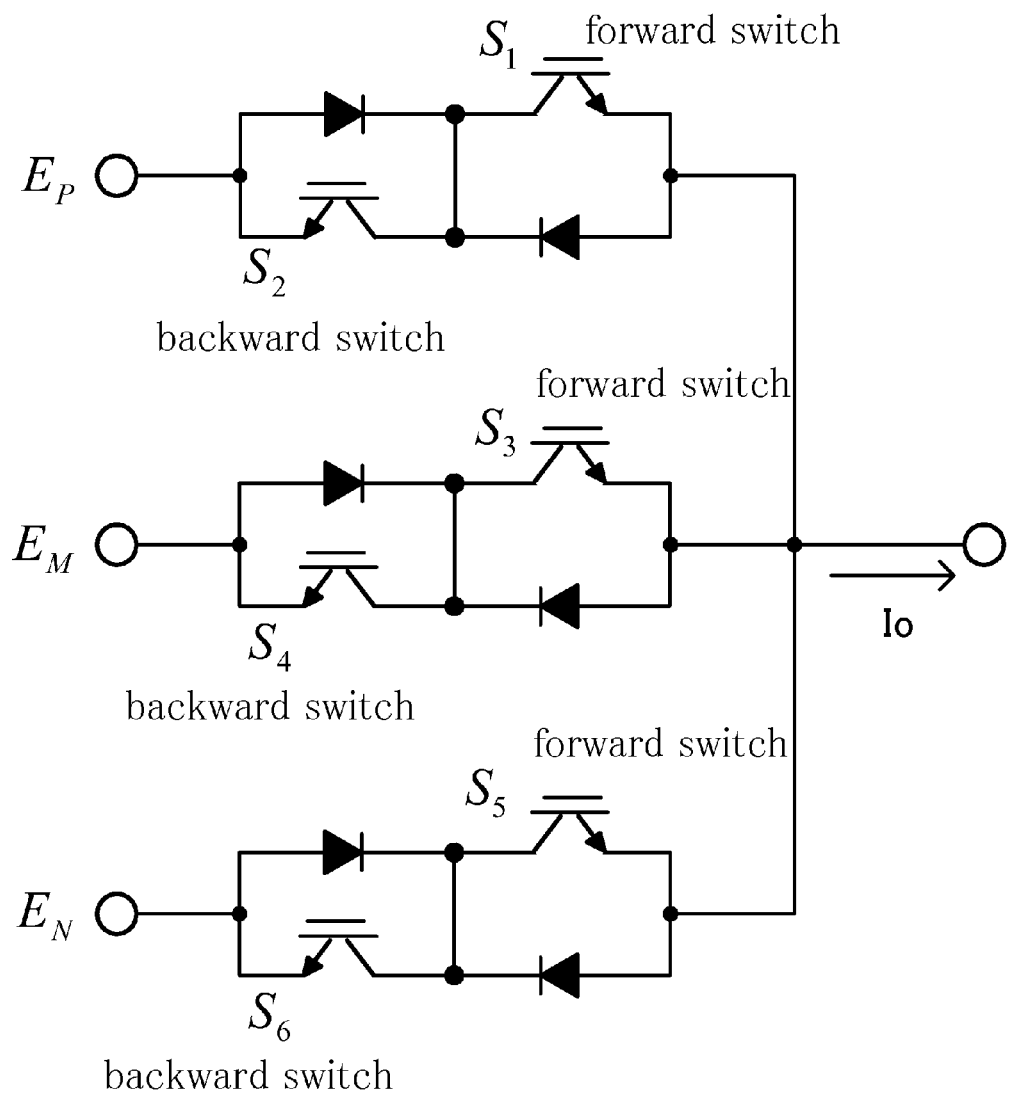
FIG. 3 is a diagram showing another example of a switch configuration in the power conversion device according to the first embodiment of the invention.

FIG. 3 is a diagram showing an another example of a switch configuration in the power conversion device according to the first embodiment of the invention.

Figure 4:
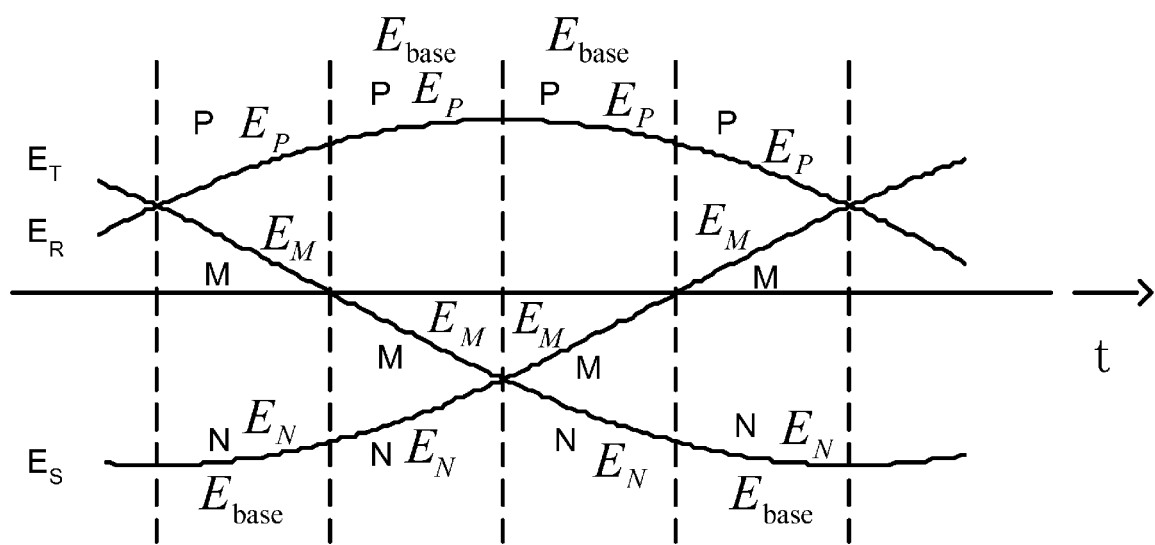
FIG. 4 is a diagram showing the correspondence between the state of an input power supply and ($E_P, E_M, E_N$)

FIG. 4 is a diagram showing the correspondence between the state of an input power supply and ($E_P, E_M, E_N$).

In the power conversion device according to the first embodiment of the invention, the switch configuration is formed by a combination of a reverse blocking switch element or a switch element and a rectifier element.

A forward switch is a switch that is headed from a power supply toward a load, and a backward switch is a switch that is headed from a load toward a power supply.

As shown in FIG. 4, $E_P$, $E_M$, and $E_N$ are decided on the basis of the potential states of phases of three-phase input power supplies $E_R$, $E_S$, and $E_T$, respectively.

Usually, a neutral point voltage cannot be directly observed. Therefore, with respect to the three-phase potential state, resistors having the same resistance are connected like a star in each phase of the three-phase power supply, and a node voltage is measured as a virtual neutral point voltage.

A phase voltage is obtained from a line voltage by an equation (for example, an R-phase voltage ER can be calculated as ER=(ERS−ETR)/3 by using a line voltage ERS of the R phase and the S phase and a line voltage ETR of the T phase and the R phase).

First, commutation that causes the switching operation of the switch configuration in the direct AC power conversion device will be described.

Figure 5:
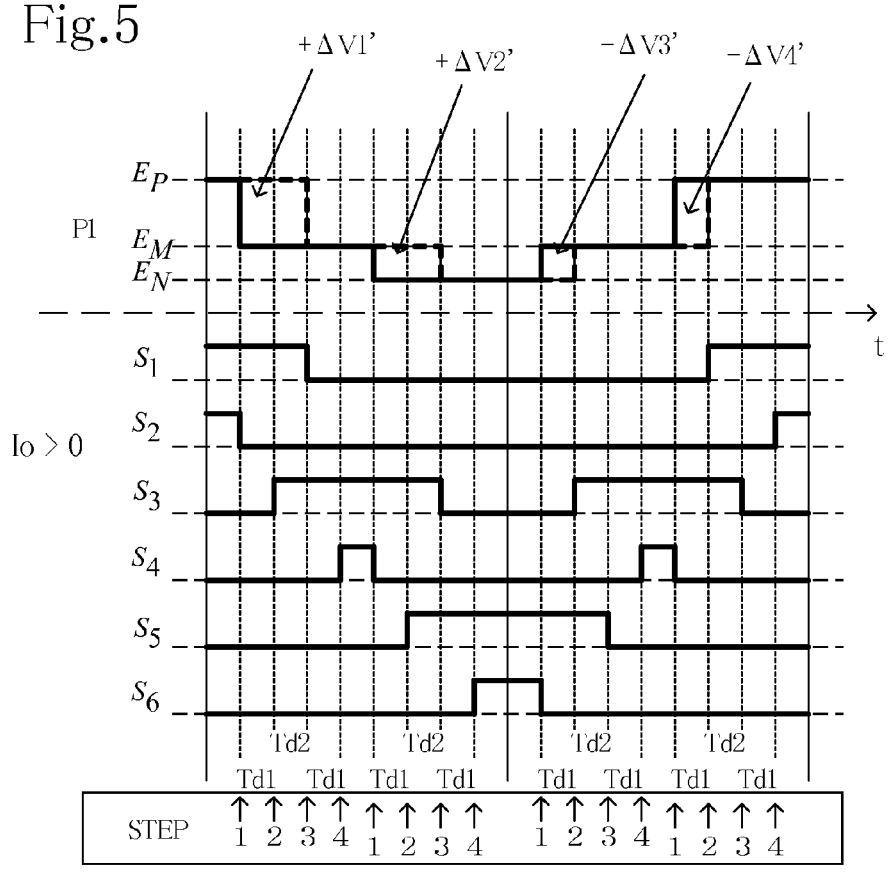
FIG. 5 is a diagram showing an example of a PWM pulse waveform of a four-step commutation operation in a direct AC power conversion device.
Figure 5:
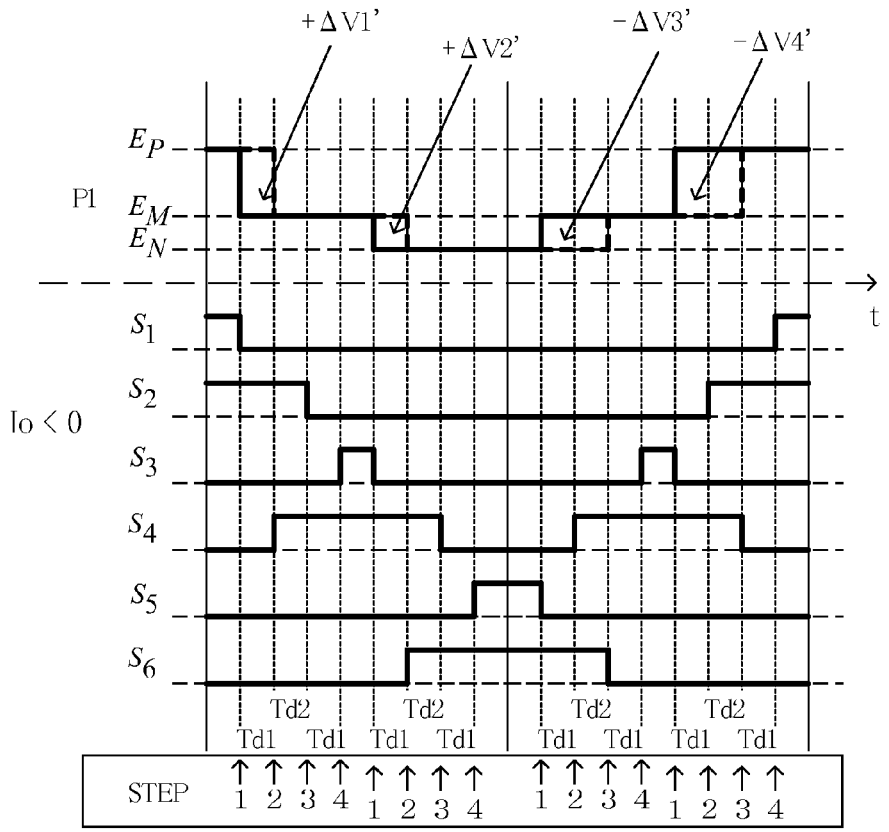

FIG. 5 is a diagram showing an example of a PWM pulse waveform of a four-step commutation operation in a direct AC power conversion device.

Figure 6:
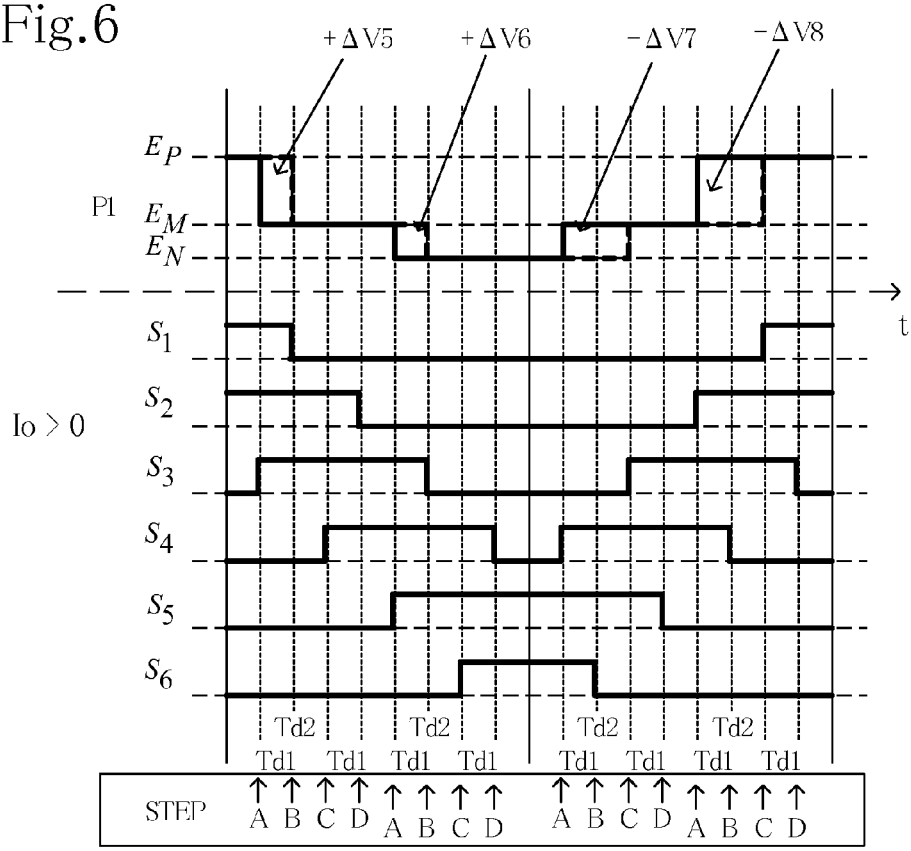
FIG. 6 is a diagram showing an another example of a PWM pulse waveform of a four-step commutation operation in a direct AC power conversion device.
Figure 6:
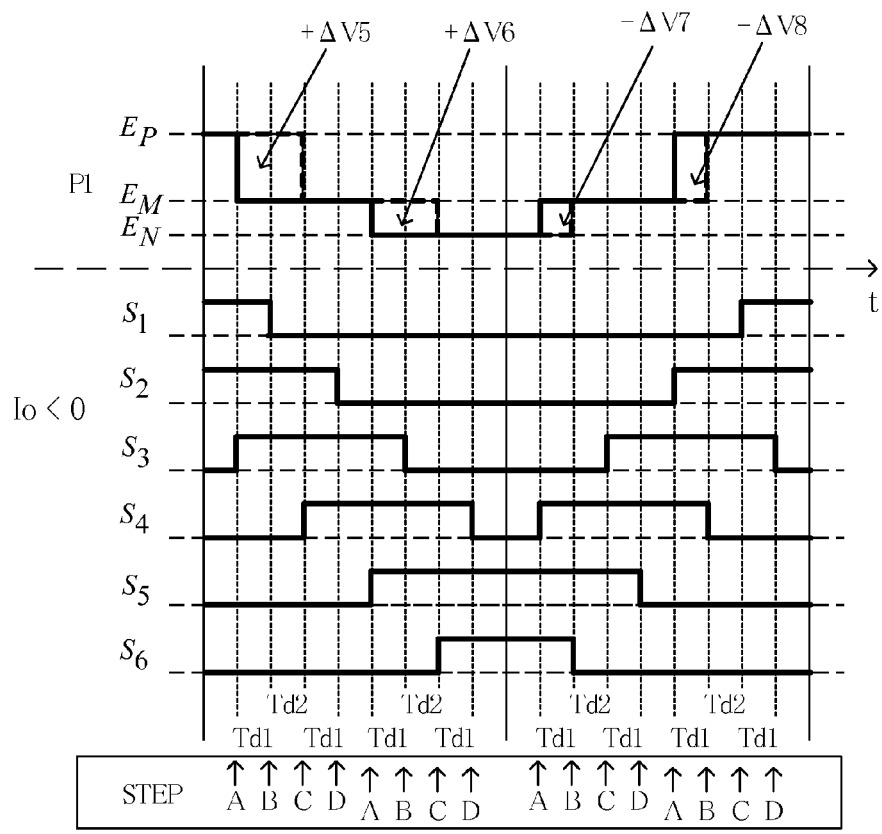

FIG. 6 is a diagram showing an another example of a PWM pulse waveform of a four-step commutation operation in a direct AC power conversion device.

Figure 7:
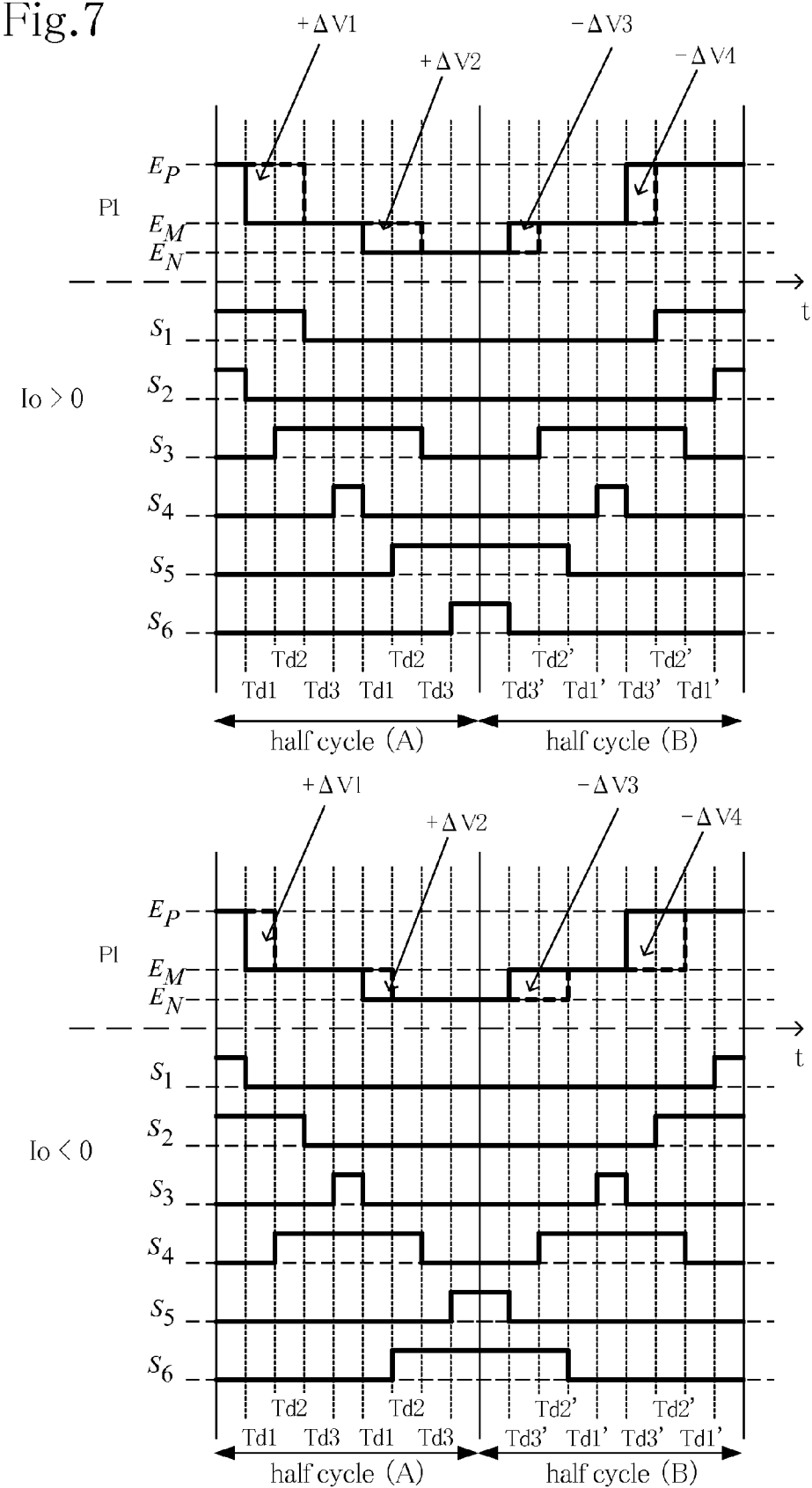
FIG. 7 is a diagram showing an example of a PWM pulse waveform of a four-step commutation operation in the power conversion device according to the first embodiment of the invention.

FIG. 7 is a diagram showing an example of a PWM pulse waveform of a four-step commutation operation in the power conversion device according to the first embodiment of the invention.

FIG. 5 shows a waveform example when, in the switch configuration of FIG. 2 or 3, four-step commutation in which the on/off sequence of respective switches is switched in accordance with the polarity of a phase output current (Io) is used, and a V phase in a three-phase (U, V, W) output is switched.

In the following description, it is assumed that the polarity of the output current (Io) is positive (Io>0) when a current flows from a power supply toward a load. In FIG. 5, an upper view shows when the polarity of the output current (Io) is positive (Io>0), and a lower view shows when the polarity of the output current (Io) is negative (Io<0).

In FIG. 5, the four-step commutation is a commutation method that decides the on/off sequence of the respective switches on the basis of information on the flow direction (polarity) of the output current so as to inhibit short circuit between the phases of the input power supply and open circuit between the output phases.

The four-step commutation includes a step 1 in which a switch at the commutation source having a polarity opposite to the polarity of the load current (a backward switch of the commutation source) is turned off, a step 2 in which a switch at the commutation destination having the same polarity as the polarity of the load current (a forward switch of the commutation destination) is turned on, a step 3 in which a switch at the commutation source having the same polarity as the polarity of the load current (a forward switch of the commutation source) is turned off, and a step 4 in which a switch at the commutation destination having a polarity opposite to the polarity of the load current (a backward switch of the commutation destination) is turned on.

A waveform P1 includes a pulse waveform (solid line) like a command and a waveform (broken line) which is actually output, and a hatched portion represents an error (commutation error) of a voltage.

Waveforms S1 to S6 are on/off signals of the respective switches, and each switch is turned on at a High level and is turned off at a Low level. As will be seen from FIG. 5, the commutation error varies depending on the polarity of the output current.

When the polarity of the output current (Io) is positive (Io>0) (upper view), the commutation error increases by ΔV1' and ΔV2' and decreases by ΔV3' and ΔV4'.

$$\Delta V1'=(E_P-E_M)\times(Td1+Td2)$$

$$\Delta V2'=(E_M-E_N)\times(Td1+Td2)$$

$$\Delta V3'=(E_M-E_N)\times(Td1)$$

$$\Delta V4'=(E_P-E_M)\times(Td1)$$

One PWM cycle becomes as follows, and the output voltage becomes higher than original.

$$\Delta V1'+\Delta V2'-\Delta V3'-\Delta V4'=(E_P-E_N)\times(Td2)$$

When the polarity of the output current (Io) is negative (Io<0) (lower view), the commutation error increases by ΔV1' and ΔV2' and decreases by ΔV3' and ΔV4'.

$$\Delta V1'=(E_P-E_M)\times(Td1)$$

$$\Delta V2'=(E_M-E_N)\times(Td1)$$

$$\Delta V3'=(E_M-E_N)\times(Td1+Td2)$$

$$\Delta V4'=(E_P-E_M)\times(Td1+Td2)$$

One PWM cycle becomes as follows, and the output voltage becomes lower than original.

$$\Delta V1'+\Delta V2'-\Delta V3'-\Delta V4'=-(E_P-E_N)\times(Td2)$$

As described above, the commutation error that is generated by the four-step commutation for switching the on/off sequence of the switches in accordance with the polarity of the phase output current (Io) varies depending on the polarity of the current and becomes a distortion (voltage error) of the output voltage. When the voltage error is corrected, it is necessary to provide, inside a controller of the power conversion device, a control loop that detects the polarity of the current flowing to the switch element and performs correction. When a pulse width decreases in accordance with a correction amount, if the pulse width to be corrected becomes zero by correction, correction may not be sufficiently performed.

FIG. 6 shows a waveform example when, in the switch configuration of FIG. 2 or 3, four-step commutation in which the on/off sequence of the switches is not switched in accordance with the polarity of the phase output current (Io) is used, and the V phase in the three-phase (U, V, W) output is switched.

In FIG. 6, an upper view shows when the polarity of the output current (Io) is positive (Io>0), and a lower view shows when the polarity of the output current (Io) is negative (Io<0).

In FIG. 6, the four-step commutation is a commutation method that decides the on/off sequence of the switches on the basis of the potential level of the input power supply, that is, on the basis of an interphase voltage so as to inhibit short circuit between the phases of the input power supply and open circuit between the output phases.

The four-step commutation includes a step A in which a switch at the commutation destination to be backward biased by the interphase voltage is turned on, a step B in which a switch at the commutation source to be forward biased by the interphase voltage is turned off, a step C in which a switch at the commutation destination to be forward biased by the interphase voltage is turned on, and a step D in which a switch at the commutation source to be backward biased by the interphase voltage is turned off. In this case, as shown in FIG. 5, the on/off sequence of the switches does not vary depending on the direction (polarity) of the output current.

A waveform P1 includes a pulse waveform (solid line) like a command and a waveform (broken line) which is actually output, and a hatched portion represents an error (commutation error) of a voltage.

Waveforms S1 to S6 are on/off signals of the respective switches, and each switch is turned on at a High level and is turned off at a Low level. As will be seen from FIG. 6, the commutation error varies depending on the polarity of the output current.

When the polarity of the output current (Io) is positive (Io>0) (higher view), the commutation error increases by $\Delta V5$ and $\Delta V6$ and decreases by $\Delta V7$ and $\Delta V8$.

$$\Delta V5 = (E_P - E_M) \times (Td1)$$

$$\Delta V6 = (E_M - E_N) \times (Td1)$$

$$\Delta V7 = (E_M - E_N) \times (Td1 + Td2)$$

$$\Delta V8 = (E_P - E_M) \times (Td1 + Td2)$$

One PWM cycle becomes as follows, and the output voltage becomes lower than original.

$$\Delta V5 + \Delta V6 - \Delta V7 - \Delta V8 = -(E_P - E_N) \times (Td2)$$

When the polarity of the output current (Io) is negative (Io<0) (lower view), the commutation error increases by $\Delta V5$ and $\Delta V6$ and decreases by $\Delta V7$ and $\Delta V8$.

$$\Delta V5 = (E_P - E_M) \times (Td1 + Td2)$$

$$\Delta V6 = (E_M - E_N) \times (Td1 + Td2)$$

$$\Delta V7 = (E_M - E_N) \times (Td1)$$

$$\Delta V8 = (E_P - E_M) \times (Td1)$$

One PWM cycle becomes as follows, and the output voltage becomes higher than original.

$$\Delta V5 + \Delta V6 - \Delta V7 - \Delta V8 = (E_P - E_N) \times (Td2)$$

As described above, the commutation error that is generated by the four-step commutation in which the on/off sequence of the switches is not switched in accordance with the polarity of the phase output current (Io) also varies depending on the polarity of the current and becomes a distortion (voltage error) of the output voltage. When the voltage error is corrected, it is necessary to provide, inside a controller of the power conversion device, a control loop that detects the polarity of the current flowing to the switch element and performs correction. When a pulse width decreases in accordance with a correction amount, if the pulse width to be corrected becomes zero by correction, correction may not be sufficiently performed.

FIG. 7 is a diagram showing an example of a PWM pulse waveform of a four-step commutation operation in the power conversion device according to the first embodiment of the invention.

In the power conversion device according to the first embodiment of the invention, the PWM pulse generator 4b of the controller 4 performs four-step commutation, in which open circuit between the output phases and short circuit between the power supply phases are prevented by switching commutation patterns, in accordance with the current polarities of the output phases, and generates PWM pulses.

The four-step commutation includes a step 1 in which a switch at the commutation source having a polarity opposite to the polarity of the load current (a backward switch of the commutation source) is turned off, a step 2 in which a switch at the commutation destination having the same polarity as the polarity of the load current (a forward switch of the commutation destination) is turned on, a step 3 in which a switch at the commutation source having the same polarity as the polarity of the load current (a forward switch of the commutation source) is turned off, and a step 4 in which a switch at the commutation destination having a polarity opposite to the polarity of the load current (a backward switch of the commutation destination) is turned on. That is, The four-step commutation performs commutation in a sequence of step 1→step 2→step 3→step 4.

During a first half cycle (A) of a PWM cycle, commutation is performed from a high potential power supply phase to a low potential power supply phase. Let an interval time between the step 1 and the step 2 be Td1, an interval time between the step 2 and the step 3 be Td2, and an interval time between the step 3 and the step 4 be Td3.

During a second half cycle (B) of a PWM cycle, commutation is performed from a low potential power supply phase to a high potential power supply phase. Let an interval time between the step 1 and the step 2 be Td3', an interval time between the step 2 and the step 3 be Td2', and an interval time between the step 3 and the step 4 be Td1'.

In the power conversion device according to the first embodiment of the invention, the pulse width during a half PWM cycle varies depending on a voltage command that is generated by the control circuit 4d (voltage command generator) of the controller 4.

When the polarity of the output current (Io) is positive (Io>0) (upper view), the commutation error increases by $\Delta V1$ and $\Delta V2$ and decreases by $\Delta V3$ and $\Delta V4$.

$$\Delta V1 = (E_P - E_M) \times (Td1 + Td2)$$

$$\Delta V2 = (E_M - E_N) \times (Td1 + Td2)$$

$$\Delta V3 = (E_M - E_N) \times (Td3')$$

$$\Delta V4 = (E_P - E_M) \times (Td3')$$

One PWM cycle becomes as follows.

$$\Delta V1 + \Delta V2 - \Delta V3 - \Delta V4 = (E_P - E_N) \times (Td1 + Td2 - Td3')$$

When the polarity of the output current (Io) is negative (Io<0) (lower view), the commutation error increases by $\Delta V1$ and $\Delta V2$ and decreases by $\Delta V3$ and $\Delta V4$.

$$\Delta V1 = (E_P - E_M) \times (Td1)$$

$$\Delta V2 = (E_M - E_N) \times (Td1)$$

$$\Delta V3 = (E_M - E_N) \times (Td2' + Td3')$$

$$\Delta V4 = (E_P - E_M) \times (Td2' + Td3')$$

One PWM cycle becomes as follows.

$$\Delta V1 + \Delta V2 - \Delta V3 - \Delta V4 = (E_P - E_N) \times (Td1 - Td2' - Td3')$$

The power conversion device according to the first embodiment of the invention switches settings of Td1, Td2, Td2', and Td3'. For example, when Io>0, the relationship Td1+Td2=Td3' (Td1, Td2, Td3'>0) is established, and when Io<0, the relationship Td1=Td2'+Td3' (Td1, Td2', Td3'>0) is established.

As described above, if the interval time is switched depending on the polarity of the output current, the commutation error that is generated during one PWM cycle is cancelled, and no commutation error is generated.

The values Td3 and Td1' are preferably equal to or more than zero. The relationship Td3=Td3' and Td1'=Td1 may be established. Hereinafter, it is assumed that, with respect to the step time which is not particularly specified, the same value is set so as to establish the relationship Td1=Td1', Td2=Td2', and Td3=Td3'.

If Td1 and Td1' secure a turn-off time, Td2 and Td2' secure a turn-on time, and Td3 and Td3' secure a turn-off time, the switches are not in a short circuit state.

Therefore, for example, if a semiconductor device is set to have a turn-on time of 300 ns and a turn-off time of 800 ns, it should suffice that when Io>0, Td1=1 µs, Td2=500 ns, and Td3'=1.5 µs, and when Io<0, Td1=1.5 µs, Td2'=500 ns, and Td3'=1 µs.

Figure 8:
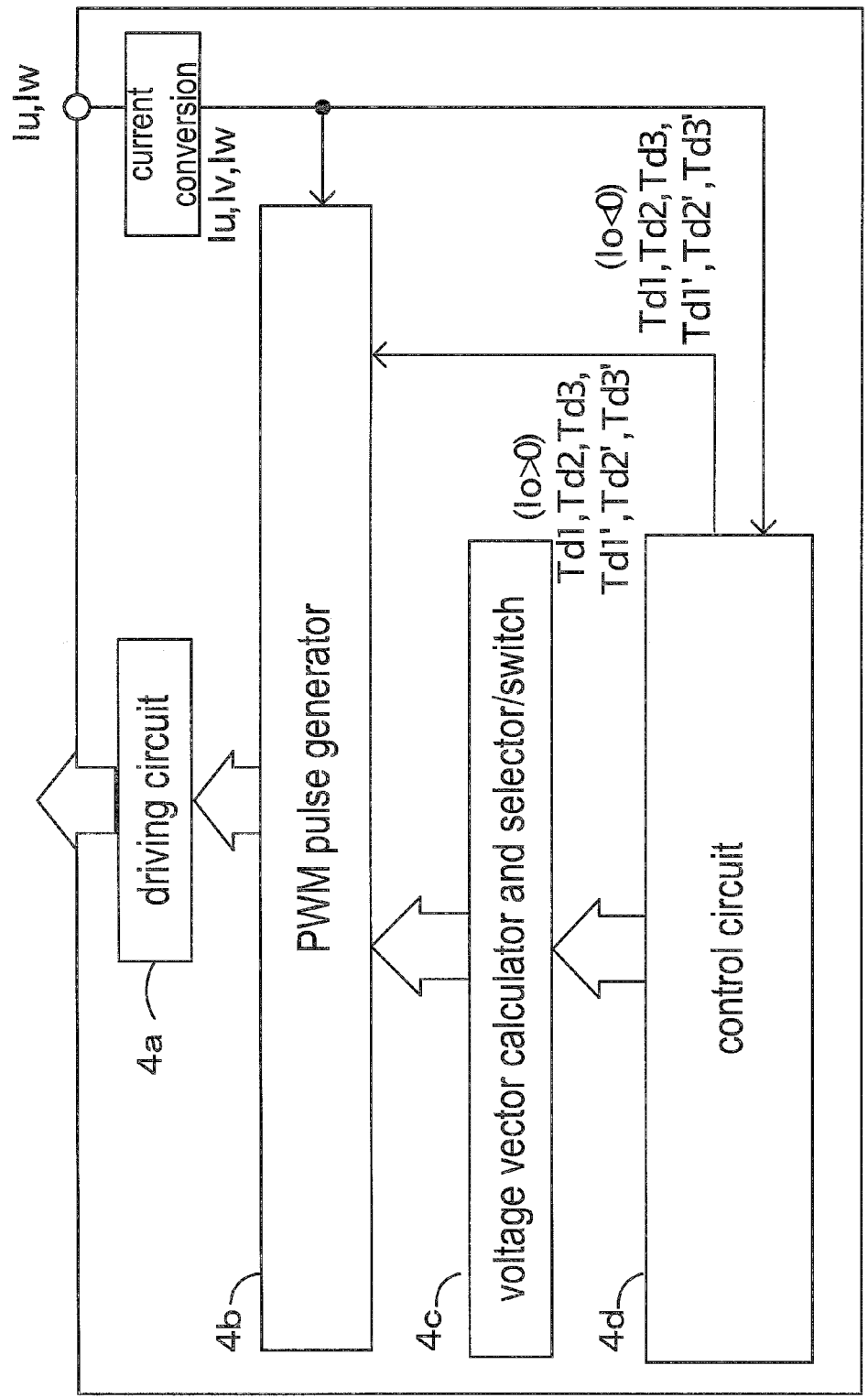
FIG. 8 is a diagram showing the specific configuration of a controller in the power conversion device according to the first embodiment of the invention.

FIG. 8 is a diagram showing the specific configuration of the controller 4 in the power conversion device according to the first embodiment of the invention. In FIG. 8, when Io>0 or Io<0, the parameters Td1 to Td3' are given from the control circuit 4d (voltage command generator) to the PWM pulse generator 4b in the controller 4.

The PWM pulse generator 4b determines the polarity from information on the output current (Iu, Iv, and Iw), and switches the interval time.

If this concept is used, the commutation error is not cancelled during a PWM cycle, but an error that is generated for an average time (for example, two or three PWM cycles) may be cancelled. In this case, a distortion increases, as compared with a case an error is cancelled during a PWM cycle.

Next, a power conversion device according to a second embodiment of the invention will be described.

Figure 9:
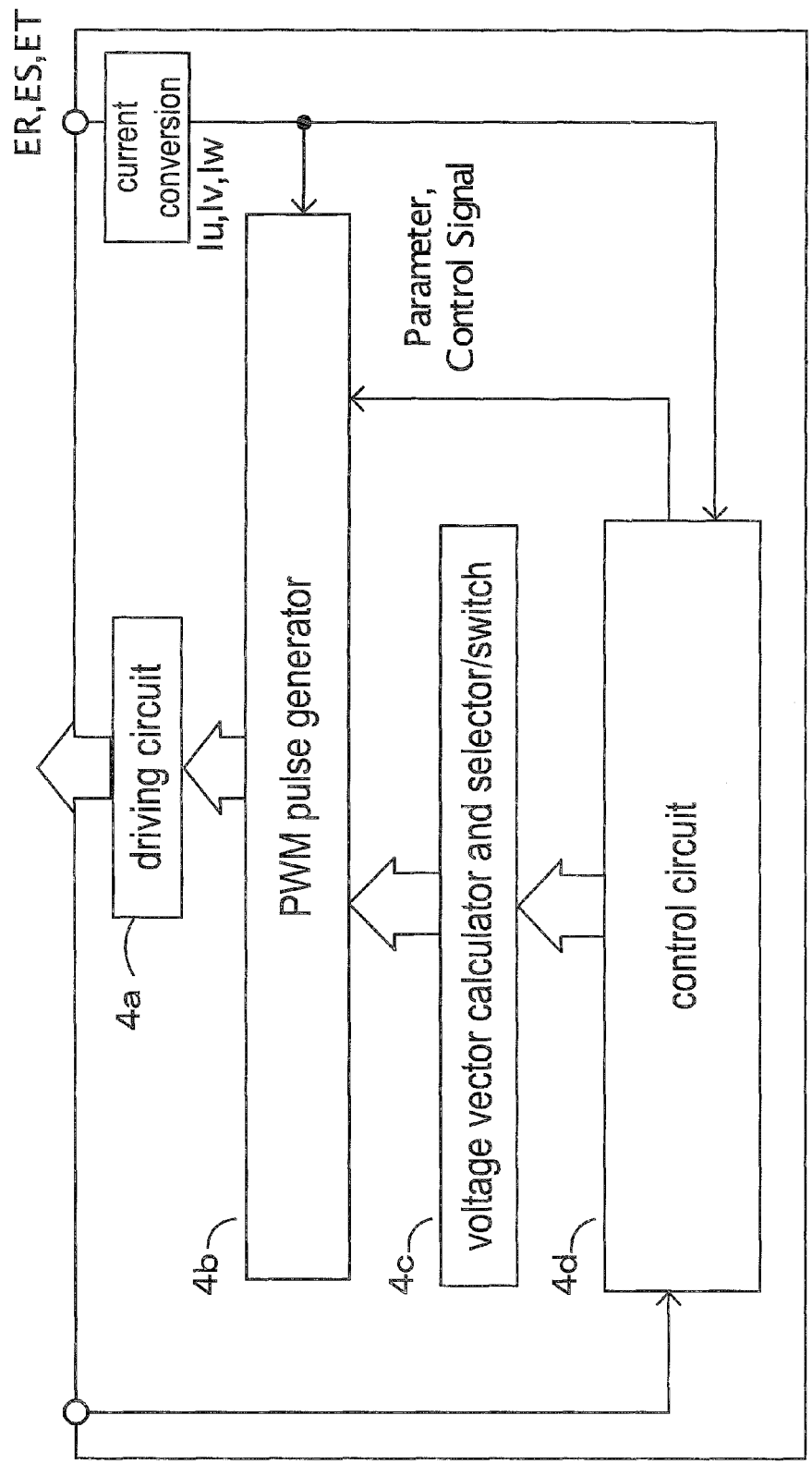
FIG. 9 is a diagram showing the specific configuration of a controller in the power conversion device according to the second embodiment of the invention.

FIG. 9 is a diagram showing the specific configuration of a controller 4 in the power conversion device according to the second embodiment of the invention. The coverall configuration of the power conversion device is the same as the first embodiment.

In FIG. 9, the parameters (the set values of Td1, Td2, Td3, Td1', Td2', and Td3') that are given from the control circuit 4d to the PWM pulse generator 4b increase in accordance with the states of input power supplies ER, ES, and ET. The PWM pulse generator 4b is configured to change the interval time of the half cycles (A) and (B) of FIG. 7 in accordance with the parameters.

In FIG. 7, near zero is set in commutation between $E_P$ and $E_M$, and when the values $E_M$ and $E_N$ are close to each other in $E_M \Leftrightarrow E_N$ commutation, the parameters vary in consideration of a turn-on/turn-off delay time.

The power conversion device according to the second embodiment of the invention takes the turn-on and turn-off delay time depending on the characteristics of a semiconductor device to be applied into consideration, in addition to the defined time Td1, Td2, Td3, Td1', Td2', and Td3' in FIG. 7.

For example, when the turn-on time and the turn-off time of a large capacity semiconductor device or the like to be applied are all long ranging from about 2 µs to 10 µs, if Io>0, Td3 is in the range of 4 to 20 µs. If Io<0, Td1' is in a range of 4 to 20 µs. That is, a commutation time may be significantly extended, when the PWM pulse width is narrow, commutation may not be suitably performed, and voltage/current may be distorted.

The condition in FIG. 7 for solving this problem is $E_P > E_M \geq E_N$. Under this condition, even if the switches S2 and S3 are turned on/off simultaneously, and the switches S4 and S5 are turned on/off simultaneously, no short circuit of the input power supply is generated.

The above-described problem can be solved by shortening Td1 when Io>0 or Td3' when Io<0. Therefore, when the commutation operation that is performed two times during the period of the half cycles (A) and (B) in FIG. 7 is performed, if Io>0, Td1 is changed, and if Io<0, Td3' is changed.

If Td1 is set to zero when Io>0, and Td3' is set to zero when Io<0, the values $E_M$ and $E_N$ are close to each other, and determination of $E_M$ and $E_N$ may become wrong due to an error in voltage detection of the input power supply phase.

In this case, at the time of commutation with a change $E_M \Leftrightarrow E_N$ of the output voltage, the input power supplies $E_M$ and $E_N$ may be short-circuited. When the difference between the values $E_M$ and $E_N$ is larger than the error in voltage detection or in the case of commutation with a change $E_P \Leftrightarrow E_M$, short circuit is hardly generated.

Therefore, when Io<0, it is preferable that Td3' is not set to zero, and a loss due to short circuit can be prevented.

An LC filter is provided between each of the input power supplies ER, ES, and ET and a corresponding switch. Therefore, when a difference is made between each of the input power supplies $E_P$, $E_M$, and $E_N$ and the voltage to be applied to the corresponding switch due to voltage oscillation of the LC filter, simple adjustment to near zero may cause short circuit.

Voltage oscillation of the LC filter often occurs in a transition state, such as abrupt acceleration or deceleration, and rarely occurs in a normal operation state. Therefore, the control circuit 4d shown in FIG. 9 determines a transition operation or a normal operation on the basis of the states of the output currents Iu, Iv, and Iw (or the state of the input current when an input current detector is added), and issues a control signal from the control circuit 4d to the PWM pulse generator 4b so as to permit adjustment to near zero in the normal operation state and to inhibit adjustment to near zero in the transition operation state.

In the power conversion device according to the second embodiment of the invention, since switching is performed as described above, the distortion of the input/output voltage and current can be safely improved.

Next, a power conversion device according to a third embodiment of the invention will be described.

A power conversion device according to a third embodiment of the invention focuses on that, when four-step commutation is used, an commutation error which is generated in a PWM cycle increases a voltage if Io>0 and decreases a voltage if Io<0, and an error due to a voltage drop of a semiconductor device to be applied decreases a voltage if Io>0 and increases a voltage if Io<0.

That is, the power conversion device according to the third embodiment of the invention uses a four-step commutation method in which an error due to a voltage drop of a semiconductor device to be applied and a commutation error are cancelled each other. The overall configuration of the power conversion device is the same as the first embodiment.

A semiconductor device, such as an IGBT or a diode, which is applied to the power conversion device undergoes a voltage drop when a current flows.

The voltage drop is about several volt (1 to 5 V) per device. Therefore, like the configuration shown in FIGS. 1 to 3, in the case of a current path in which a current flows from the three-phase input power supply to the load and returns to the input power supply, a total voltage drop of a semiconductor device to be applied may be about ten-odd volt.

The voltage drop whose generation direction varies by a current direction acts on so as to decrease the output voltage of the power conversion device.

When the output voltage of the power conversion device is low, an influence of the error due to the voltage drop becomes large, and the voltage and current distortion increases.

Let a voltage drop for one phase of a semiconductor device in a current path of the power conversion device be $\Delta Vf$ and one PWM cycle be Tc, the relationship between the voltage drop $\Delta Vf$ and the PWM pulse width equivalent Tdf is $|\Delta Vf| \times Tc = (E_P - E_N) \times Tdf$.

When the polarity of the output current (Io) is positive (Io>0), since $\Delta Vf<0$, the relationship $\Delta Vf \times Tc = -(E_P - E_N) \times Tdf$ is established.

When the polarity of the output current (Io) is negative (Io<0), since $\Delta Vf>0$, the relationship $\Delta Vf \times Tc = (E_P - E_N) \times Tdf$ is established.

When the polarity of the output current (Io) is positive (Io>0), if the relationship Td1+Td2=Td3'+Tdf (Td1, Td2, Td3, Tdf>0) is established, the relationship $\Delta V1 + \Delta V2 - \Delta V3 - \Delta V4 = (E_P - E_N) \times (Td1 + Td2 - Td3') = (E_P - E_N) \times Tdf$ is established for one PWM cycle.

When the polarity of the output current (Io) is negative (Io<0), if the relationship Td1+Tdf=Td2'+Td3' (Td1, Td2, Td3, Tdf>0) is established, the relationship $\Delta V1 + \Delta V2 - \Delta V3 - \Delta V4 = -(E_P - E_N) \times (Td1 - Td2' - Td3') = -(E_P - E_N) \times Tdf$ is established for one PWM cycle. If the commutation error and the error due to the voltage drop for one PWM cycle are added, they are cancelled each other, and the voltage error becomes zero.

The PWM pulse width equivalent Tdf can be obtained by an equation $Tdf = Tc \times \Delta Vf / (E_P - E_N)$. Tdf varies depending on the voltage or phase of the input power supply and the current value.

For example, when the three-phase input power supply is AC 200 V (the peak value of $E_P - E_N$: about 282 V), and the PWM cycle Tc is 125 μs, if $\Delta Vf=10$ V, Tdf becomes about 4 μs ($\cong 125$ μs×10 V/282 V).

The PWM pulse generator 4b of FIG. 1 generates Td1, Td2, Td3, and Tdf. The PWM pulse generator 4b is formed by a logic circuit. The times Td1, Td2, Td3, and Tdf are managed and adjusted by clock counting of the logic circuit.

If the clock frequency of the logic circuit is set to about 50 MHz, Tc=125 μs. If the clock frequency=50 MHz, the resolution $\Delta Tdf$ of Tdf is 1/50 MHz=20 ns.

The resolution of $\Delta Vf$ is about 45 mV ($\cong 282V \times 20$ ns/125 μs) from $(E_P - E_N) \times \Delta Tdf / Tc$.

When Tdf=4 μs, the set time of each step of the steps 1 to 4 is set as follows on the basis of the settings in the first embodiment. For example, if Tdf is divided into two segments and distributed, when Io>0, Td1=3 μs (=1μ+Tdf/2), Td2=2.5 μs (=0.5μ+Tdf/2), and Td3'=1.5 μs. When Io<0, Td1=1.5 μs, Td2'=2.5 μs (=0.5μ+Tdf/2), and Td3'=3 μs (=1μ+Tdf/2).

The power conversion device according to the third embodiment of the invention can perform minute control of correction of a voltage drop of a semiconductor device through Tdf adjustment. The voltage drop due to the current flowing to the semiconductor device changes depending on the current value flowing to the semiconductor device, and thus, the controller 4 of FIG. 8 is used, for example.

The output current or the input current of the power conversion device is detected, the instantaneous value of the current flowing to the semiconductor device is obtained, and Tdf is adjusted in accordance with the current flowing to the semiconductor device and the detection value of $(E_P - E_N)$. In this way, the output voltage of the power conversion device can be corrected, and the distortion of the input/output voltage and current can be improved.

Next, a power conversion device according to a fourth embodiment of the invention will be described.

In the power conversion device according to the third embodiment of the invention, since correction of the voltage drop is added to the commutation time, the total commutation time is extended. In addition, when the pulse width is shortened, the voltage is distorted.

A power conversion device according to a fourth embodiment of the invention uses, for example, the controller 4 of FIG. 9. The overall configuration of the power conversion device is the same as the first embodiment.

In FIG. 7, at the time of the commutation operation that is performed two times during the period of the half cycles (A) and (B), the interval time varies in accordance with the state of the input voltage.

If adjustment is made so as to make the commutation time as short as possible, improvement in the distortion of the input/output voltage and current, short circuit prevention of the input power supply, and loss reduction can be achieved.

Next, a power conversion device according to a fifth embodiment of the invention will be described.

Figure 10:
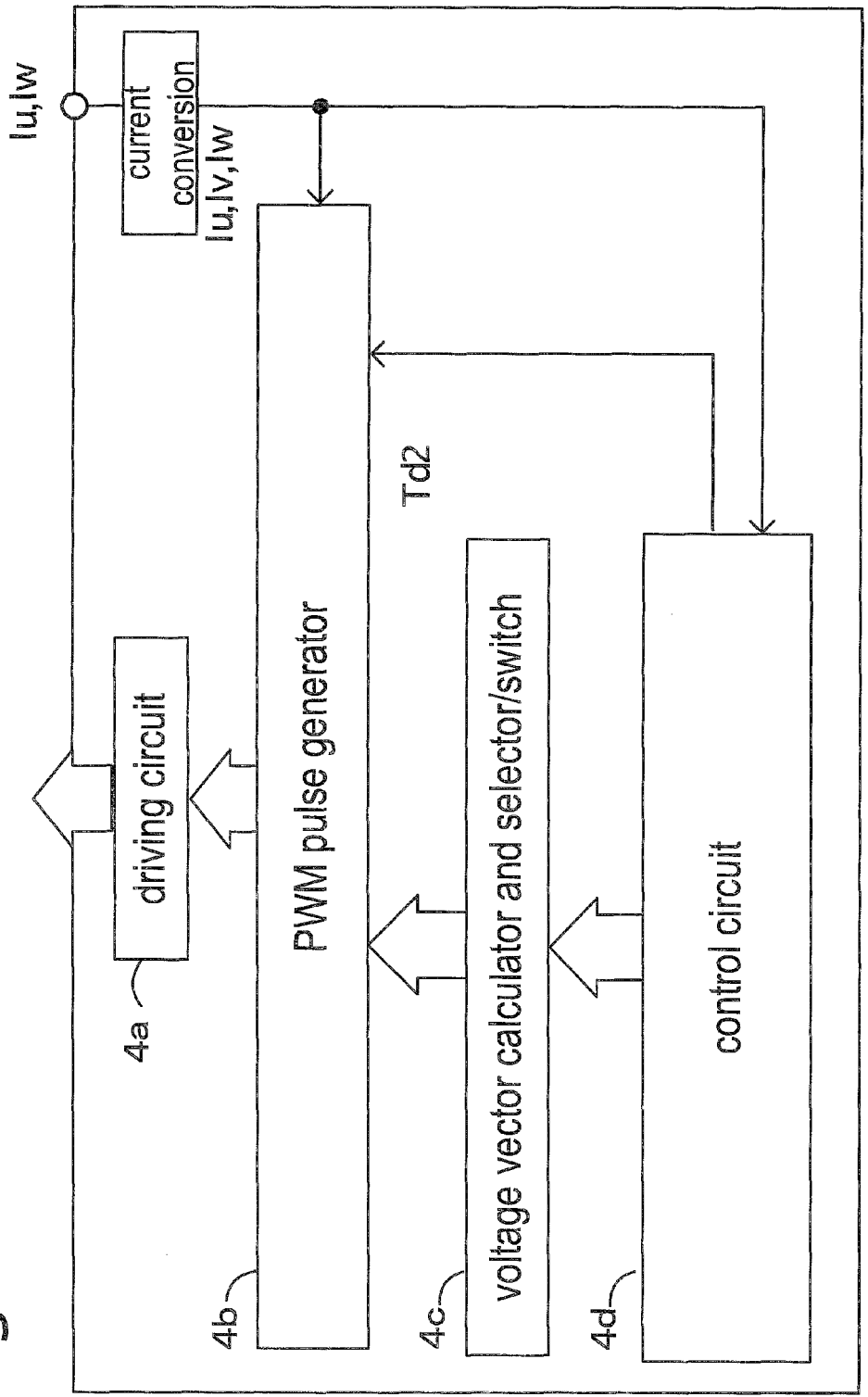
FIG. 10 is a diagram showing the specific configuration of a controller in the power conversion device according to the fifth embodiment of the invention.

FIG. 10 is a diagram showing the specific configuration of a controller 4 in the power conversion device according to the fifth embodiment of the invention. The coverall configuration of the power conversion device is the same as the first embodiment.

A semiconductor device, such as an IGBT or a diode, undergoes a slight voltage drop (Vfo) even if a current slightly flows. The value Vfo varies according to the devices, and is generally in the range of about 0.7 V to 1 V.

In the power conversion device according to the third embodiment of the invention, the voltage drop is compensated under the conditions of input voltage, carrier cycle, and clock frequency. For example, when Vfo=0.7 V, Tdf per device becomes about 300 ns ($\cong 20$ ns×0.7 V/45 mV) or more. If the number of devices in the current path is taken into consideration, Tdf becomes several times larger than 300 ns. In the case of a small capacity IGBT of tens ampere, the turn-on and turn-off time are the same, about 300 ns.

In a power conversion device according to a fifth embodiment of the invention, it is assumed that Td1=Td3' and Td2=Td2'=Tdf. In this case, a time corresponding to a degree of turn-on of a switch can be secured as the interval time Td2, and the voltage drop can be corrected, without causing the distortion of the current.

Since the delay time of Td1 and Td3' are the same, the same counter can be used in order to measure the delay time. The delay time may not vary in the operation state.

Td2 and Td2' vary depending on the absolute current value, but they do not vary depending on the current polarity. Therefore, if the same counter is used for Td2 and Td2', the counter only for Td2 varies in the operation state, and thus the logic of the PWM pulse generator can be simplified.

From the above description, in a small capacity power conversion device, the PWM pulse generator can be manufactured at low cost.

Next, a power conversion device according to a sixth embodiment of the invention will be described.

When Tdf is decided by using the input current or the output current, the value may be changed due to noise in current detection, and the current may be distorted.

A power conversion device according to a sixth embodiment of the invention includes current control inside the control circuit $4d$, and decides Tdf by using a current command for current control.

The power conversion device according to the sixth embodiment of the invention may be implemented as a stable power conversion device in which the noise component of the current detector is removed.

Next, a power conversion device according to a seventh embodiment of the invention will be described.

A power conversion device according to a seventh embodiment of the invention decides Tdf in accordance with the average value of a detection current or the average value of a current command, instead of deciding Tdf by using the instantaneous value of the detection current or the current command.

In the power conversion device according to the seventh embodiment of the invention, while the distortion of the input current and the output current increases, control of the power conversion device can be simplified. Therefore, a calculation device that has a low calculation speed and is inexpensive can be used as a calculation device (MPU, CPU, DSP, or the like) for use in the control circuit, and thus an inexpensive power conversion device can be provided.

Next, a power conversion device according to a eighth embodiment of the invention will be described.

Figure 11:
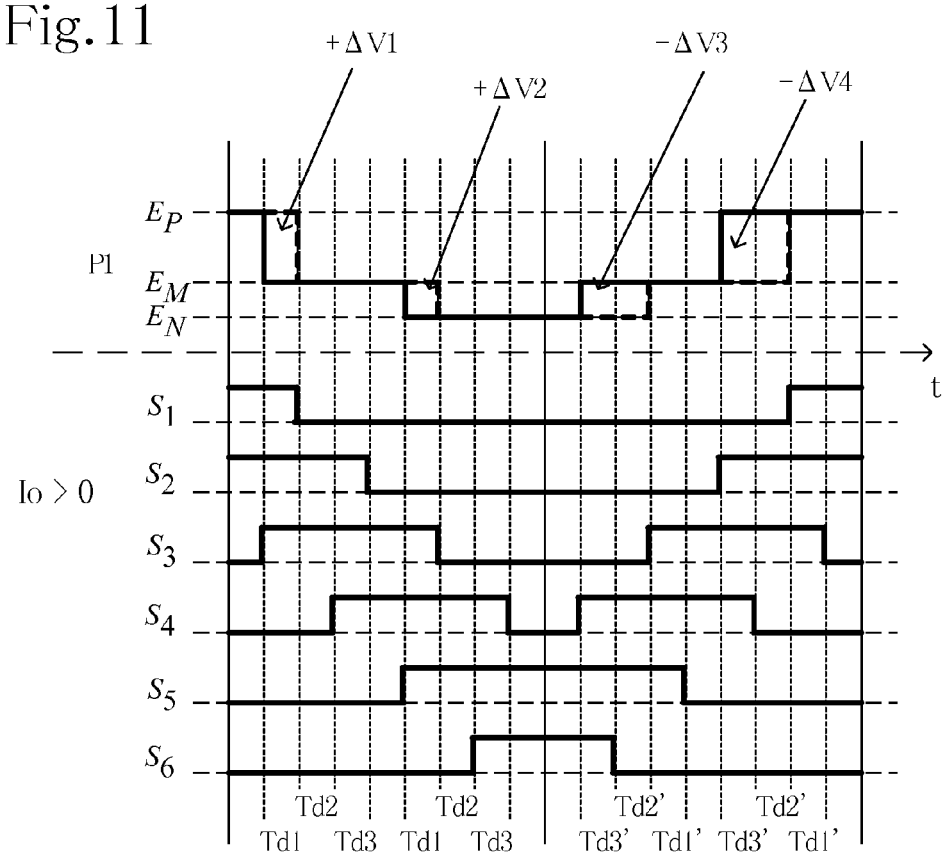
FIG. 11 is a diagram showing an example of a PWM pulse waveform of a four-step commutation operation in a power conversion device according to an eighth embodiment of the invention.
Figure 11:
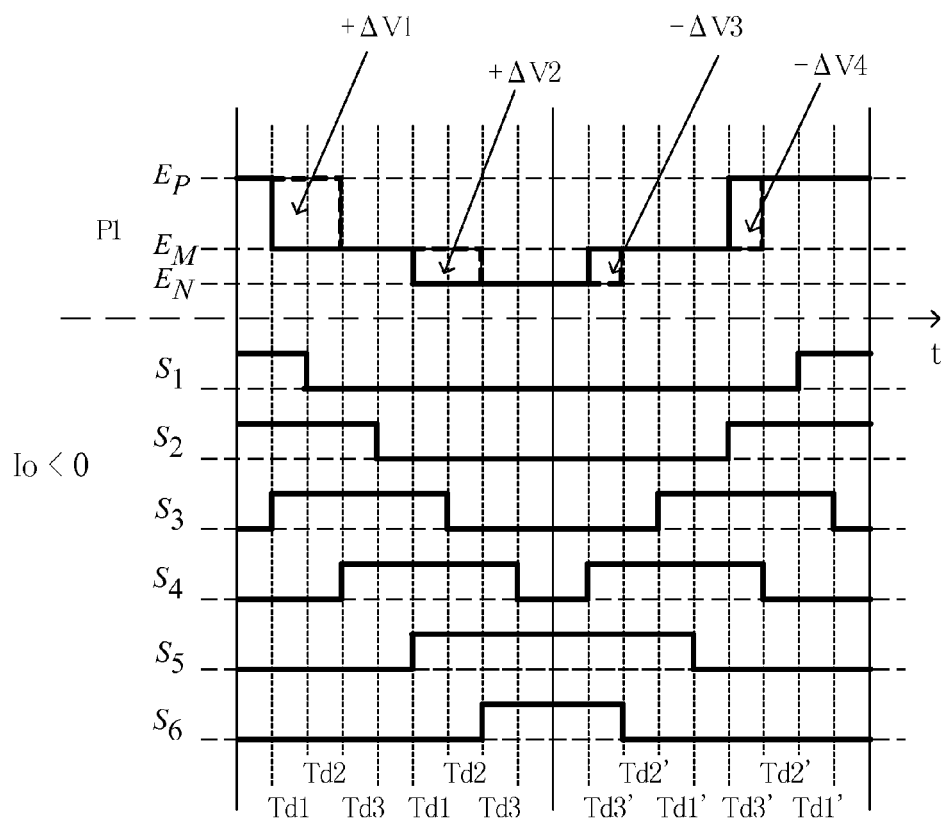

FIG. 11 is a diagram showing an example of a PWM pulse waveform of a four-step commutation operation in a power conversion device according to an eighth embodiment of the invention.

In the power conversion device according to the eighth embodiment of the invention, the PWM pulse generator $4b$ of the controller 4 performs four-step commutation, in which open circuit between the output phases and short circuit between the power supply phases are prevented, without depending on the current polarity of the output phase, and generates PWM pulses.

The four-step commutation includes a step A in which a switch at the commutation destination to be backward biased by the interphase voltage is turned on, a step B in which a switch at the commutation source to be forward biased by the interphase voltage is turned off, a step C in which a switch at the commutation destination to be forward biased by the interphase voltage is turned on, and a step D in which a switch at the commutation source to be backward biased by the interphase voltage is turned off That is, The four-step commutation performs commutation in a sequence of step A→step B→step C→step D.

During a half cycle (A) of a PWM cycle, commutation is performed from a high potential power supply phase to a low potential power supply phase. Let an interval time between a step A and a step B be Td1, an interval time between a step B and a step C be Td2, and an interval time between a step C and a step D be Td3.

During a half cycle (B) of a PWM cycle, commutation is performed from a low potential power supply phase to a high potential power supply phase. Let an interval time between a step A and a step B be Td3', an interval time between a step B and a step C be Td2', and an interval time between a step C and a step D be Td1'.

The pulse width during the half PWM cycle varies depending on a voltage command that is generated by a voltage command generator inside the control circuit $4d$.

When the polarity of the output current (Io) is positive (Io>0) (upper view), the commutation error increases by ΔV1 and ΔV2 and decreases by ΔV3 and ΔV4.

$$\Delta V1=(E_P-E_M)\times(Td1)$$

$$\Delta V2=(E_M-E_N)\times(Td1)$$

$$\Delta V3=(E_M-E_N)\times(Td2'+Td3')$$

$$\Delta V4=(E_P-E_M)\times(Td2'+Td3')$$

One PWM cycle becomes as follows, and the output voltage becomes equal.

$$\Delta V1+\Delta V2-\Delta V3-\Delta V4=(E_P-E_N)\times(Td1-Td2'-Td3')$$

When the polarity of the output current (Io) is negative (Io<0) (lower view), the commutation error increases by ΔV1 and ΔV2 and decreases by ΔV3 and ΔV4.

$$\Delta V1=(E_P-E_M)\times(Td1+Td2)$$

$$\Delta V2=(E_M-E_N)\times(Td1+Td2)$$

$$\Delta V3=(E_M-E_N)\times(Td3')$$

$$\Delta V4=(E_P-E_M)\times(Td3')$$

One PWM cycle becomes as follows, and the output voltage becomes equal.

$$\Delta V1+\Delta V2-\Delta V3-\Delta V4=(E_P-E_N)\times(Td1+Td2-Td3')$$

The power conversion device according to the eighth embodiment of the invention switches the settings of Td1, Td2, Td2', and Td3' as follows.

When positive (Io>0), the relationship Td1=Td2'+Td3' (Td1, Td2', Td3'>0) is established.

When negative (Io<0), the relationship Td1+Td2=Td3' (Td1, Td2, Td3'>0) is established.

In the power conversion device according to the eighth embodiment of the invention, if the interval time is switched in accordance with the current polarity, the commutation error that is generated during one PWM cycle can be cancelled.

In the power conversion device according to the eighth embodiment of the invention, if Td1 and Td1' secure the turn-on time, Td2 and Td2' secure the turn-off time, and Td3 and Td3' secure the turn-on time, the switches are not in a short circuit state.

Therefore, for example, if the turn-on time of the semiconductor device is set to 300 ns, and the turn-off time is set to 800 ns, it should be suffice that when Io>0, Td1=1.5 μs, Td2'=1 μs, and Td3'=500 ns, and when Io<0, Td1=500 ns, Td2=1 μs, and Td3'=1.5 μs.

The power conversion device according to the eighth embodiment of the invention can use the configuration of FIG. 8.

In the power conversion device according to the eighth embodiment of the invention, when Io>0 or Io<0, the parameters Td1 to Td3' are given from the control circuit $4d$ to the PWM pulse generator $4b$. The PWM pulse generator $4b$ determines the polarity from information on the current (Iu, Iv, and Iw) and switches the interval time.

If this concept is applied, the commutation error is not cancelled during a PWM cycle, but an error that is generated for an average time (for example, two or three PWM cycles)

may be cancelled. In this case, a distortion increases, as compared with a case an error is cancelled during a PWM cycle.

When the interval time is extended due to the use of a large capacity semiconductor device, like the power conversion device according to the second embodiment of the invention, the interval time may be changed in accordance with the state of the power supply voltage so as to be as short as possible during the PWM cycle.

Next, a power conversion device according to a ninth embodiment of the invention will be described.

A power conversion device according to a ninth embodiment of the invention is a direct AC power conversion device that uses four-step commutation, and focuses on that there are commutation in which a commutation error generated in a PWM cycle increases a voltage and commutation in which a commutation error generated in a PWM cycle decreases a voltage, and an error due to a voltage drop of a semiconductor device decreases a voltage if Io>0 and increases a voltage if Io<0.

The power conversion device according to the ninth embodiment of the invention uses a four-step commutation method that cancels the commutation error and the error due to the voltage drop each other.

Let the PWM pulse width equivalent Tdf of a voltage drop for one phase of a semiconductor device in a current path of the power conversion device be Tdf, then, when Io>0, the following relationship is established. Td1=Td2'+Td3'+Tdf (Td1, Td2', Td3', Tdf>0)

When Io<0, the following relationship is established.

$$Td1+Td2++Tdf=Td3'(Td1,Td2,Td3',Tdf>0)$$

In the power conversion device according to the ninth embodiment of the invention, the commutation error and the error due to the voltage drop during one PWM cycle are cancelled each other, and the voltage error becomes zero.

Like the power conversion device according to the sixth or seventh embodiment of the invention, Tdf may be decided.

Next, a power conversion device according to a tenth embodiment of the invention will be described.

FIG. 12 is a diagram showing an example of a PWM pulse waveform (Io>0) of a four-step commutation operation in a power conversion device according to an tenth embodiment of the invention.

FIG. 13 is a diagram showing an another example of a PWM pulse waveform (Io>0) of a four-step commutation operation in a power conversion device according to an tenth embodiment of the invention.

In FIG. 5 and FIG. 6, when $E_P$, $E_M$, and $E_N$ are the same, and Td1 and Td2 are the same, by comparison of the errors to be generated, under the condition Io>0 or Io<0, the relationship $|\Delta V1'|=|\Delta V8|$, $|\Delta V2'|=|\Delta V7|$, $|\Delta V3'|=|\Delta V6|$, and $|\Delta V4'|=|\Delta V5|$ is established. The increase and decrease directions are inverted.

A power conversion device according to a tenth embodiment of the invention includes a first four-step commutation device that prevents open circuit between output phases and short circuit between power supply phases, without allowing the PWM pulse generator to depend on the current polarity of output phase, and a second four-step commutation device that prevents open circuit of the output phases and short circuit of the power supply phases by switching commutation patterns in accordance with the current polarities of the output phases.

The power conversion device according to the tenth embodiment of the invention switches the first commutation device (FIG. 12) and the second commutation device (FIG. 13) in a half PWM cycle to cancel an error due to commutation.

FIGS. 12 and 13 show an example where Io>0, but when Io<0, similarly, the error due to commutation can be cancelled by switching in a half PWM cycle. Like FIGS. 5 and 6, when commutation is performed two times during a half PWM cycle, the commutation error can be eliminated by a combination of commutation of the power conversion device according to the first embodiment of the invention and commutation of the power conversion device according to an eighth embodiment of the invention.

In the commutation method of the power conversion device according to an eighth embodiment of the invention, when the potential difference between the power supply phases is large, commutation can be performed, without causing short circuit between the power supply phases. Meanwhile, when the potential levels of the power supply phases are reversely in error due to the error in voltage detection or the like, short circuit occurs between the power supply phases.

In the commutation method of the power conversion device according to the first embodiment of the invention, even if the potential levels of the power supply phases are reversely in error, no short circuit occurs between the power supply phases.

Therefore, during a half PWM cycle, when commutation with a high potential difference between line voltages and commutation with a low potential difference are performed, commutation of the power conversion device according to the eighth embodiment of the invention is performed as commutation with a high potential difference, and commutation of the power conversion device according to the first embodiment of the invention is performed as commutation with a low potential difference.

In this way, open circuit between the output phases and short circuit between the power supply phase can be more reliably prevented.

In the power conversion device according to each of the first to tenth embodiments of the invention, an example where the PWM pulse varies in a sequence of $E_P \to E_M \to E_N$ or $E_N \to E_M \to E_P$ has been described.

However, the invention may be applied to a case in which a PWM pulse undergoes a current change in a sequence of $E_P \to E_N$ or $E_N \to E_P$, without passing through $E_M$.

In the power conversion device according to each embodiment of the invention, a case in which, during the cycle of the PWM pulse, which changes in a sequence of $E_P \to E_M \to E_N$ or $E_N \to E_M \to E_P$, the step times Td1, Td2, and Td3 with respect to the changes of (a) $E_P \to E_M$ and (b) $E_M \to E_N$, and the changes of (c) $E_N \to E_M$ and (d) $E_M \to E_P$ are the same has been described.

However, the step times during the PWM cycle may be set to different values such that the error in the output voltage generated during the PWM cycle is cancelled.

Commutation in which the output voltage increases and commutation in which the output voltage decreases regularly vary depending on the direction of the output current (the polarity of the output current). From this, if it is configured such that the step time is switched in accordance with the polarity of the load current, a power conversion device that follows the change in the load current and cancels the voltage distortion and the voltage drop of the semiconductor device due to commutation can be implemented.

The power conversion device according to each embodiment of the invention can decrease the distortion of the output voltage or the output current and can reduce the switching loss. Therefore, high performance, low cost, and reduction in the size of the control device can be realized. From this, the invention may be applied to a power conversion device for the purpose of motor driving or frequency and voltage conversion of a system power supply.

The power conversion device according to each embodiment of the invention uses four-step commutation with high safety, thereby cancelling the distortion of the output voltage and the output current and cancelling the voltage drop based on the characteristics of the semiconductor device.

In the power conversion device according to each embodiment of the invention, the voltage errors generated during the respective half PWM cycles can have opposite polarities and the same absolute values. The commutation error during one PWM cycle is cancelled each other, and no error occurs.

The power conversion device according to each embodiment of the invention can adjust the degree of cancellation of the commutation error during one PWM cycle. The adjustment of the degree of cancellation enables correction of the voltage drop of the semiconductor device.

The power conversion device according to each embodiment of the invention can shorten the total commutation time while securing the turn-on time and the turn-off time of the semiconductor device, and can cope with a case in which the PWM pulse is narrow. Therefore, when a low voltage is output or when the output voltage is saturated, the distortion of the voltage and current waveform can be reduced.

The power conversion device according to each embodiment of the invention can perform correction of the voltage drop of the semiconductor device and can omit switching based on the current. Therefore, the configuration of the device can be simplified, and low cost of the device can be realized.

The power conversion device according to each embodiment of the invention performs correction of the voltage drop of the semiconductor device on the basis of the current command. Therefore, when the output voltage is low, current stability can be improved, and high quality can be provided at low cost.

The power conversion device according to each embodiment of the invention performs correction of the voltage drop of the semiconductor device by using the average value. Therefore, the configuration of the device can be further simplified, and low cost of the device can be realized.

What is claimed is:

1. A power conversion device that receives a three-phase AC power supply as an input and controls an output voltage in accordance with a voltage command by PWM control so as to supply power to a load including a motor, the power conversion device comprising:
    a main circuit section including:
        forward and backward switches connecting each phase of the three-phase AC power supply to each output phase connected to the load,
        an LC filter having a reactor and a capacitor and being connected between the three-phase AC power supply and each of the forward and backward switches, and
        a current detector detecting an input current or a load current; and
    a four-step commutation device generating a plurality of steps on a basis of a polarity of the load current, the plurality of steps including:
        a step 1 in which a switch at a commutation source among the forward and backward switches having a polarity opposite to the polarity of the load current is turned off,
        a step 2 in which a switch at a commutation destination among the forward and backward switches having a polarity same as the polarity of the load current is turned on,
        a step 3 in which a switch at the commutation source among the forward and backward switches having a polarity same as the polarity of the load current is turned off, and
        a step 4 in which a switch at the commutation destination among the forward and backward switches having a polarity opposite to the polarity of the load current is turned on,
    wherein the four-step commutation device performs commutation in a sequence of the step 1, the step 2, the step 3, and the step 4,
    wherein times between each of the plurality of steps during a half PWM cycle for commutation from a high potential power supply phase to a low potential power supply phase are set to Td1, Td2, and Td3 in sequence,
    wherein times between each of the plurality of steps during a half PWM cycle for commutation from the low potential power supply phase to the high potential power supply phase are set to Td3', Td2', and Td1' in sequence,
    and wherein at least of one of Td1, Td2, Td3' and Td2' is differently set between when the load current flows from the three-phase AC power supply to the load and when the load current flows from the load to the three-phase AC power supply.

2. The power conversion device according to claim 1, wherein Td1 and Td3' are differently set between when the load current flows from the three-phase AC power supply to the load and when the load current flows from the load to the three-phase AC power supply.

3. A power conversion device that receives a three-phase AC power supply as an input and controls an output voltage in accordance with a voltage command by PWM control so as to supply power to a load including a motor, the power conversion device comprising:
    a main circuit section including:
        forward and backward switches connecting each phase of the three-phase AC power supply to each output phase connected to the load,
        an LC filter having a reactor and a capacitor and being connected between the three-phase AC power supply and each of the forward and backward switches, and
        a current detector detecting an input current or a load current; and
    a four-step commutation device generating a plurality of steps on a basis of a polarity of the load current, the plurality of steps including:
        a step 1 in which a switch at a commutation source among the forward and backward switches having a polarity opposite to the polarity of the load current is turned off,
        a step 2 in which a switch at a commutation destination among the forward and backward switches having a polarity same as the polarity of the load current is turned on,
        a step 3 in which a switch at the commutation source among the forward and backward switches having a polarity same as the polarity of the load current is turned off, and
        a step 4 in which a switch at the commutation destination among the forward and backward switches having a polarity opposite to the polarity of the load current is turned on, wherein the four-step commutation device performs commutation in a sequence of the step 1, the step 2, the step 3, and the step 4, wherein times between each of the plurality of steps during a half PWM cycle for commutation from a high potential power supply phase to a low potential power supply phase are set to Td1, Td2, and Td3 in sequence, wherein times between each of the plurality of steps during a half PWM cycle for commutation from the low potential power supply phase to the high potential power supply phase are set to Td3', Td2', and Td1' in sequence, wherein the times between each of the plurality of steps when the load current flows from the three-phase AC power supply to the load are set as Td1+Td2=Td3' (Td1>0, Td2>0, and Td3'>0), and wherein the times between each of the plurality of steps when the load current flows from the load to the three-phase AC power supply are set as Td1=Td2'+Td3' (Td1>0, Td2'>0, and Td3'>0).

4. The power conversion device according to claim 3, wherein the commutation device changes Td1 and Td3' during a half PWM cycle.

5. The power conversion device according to claim 3, wherein a PWM time width corresponding to a voltage drop of the forward and backward switches is Tdf, wherein the commutation device sets the times between each of the plurality of steps when the load current flows from the three-phase AC power supply to the load as Td1+Td2=Td3'+Tdf (Td1, Td2, Td3', and Tdf>0), and wherein the commutation device sets the times between each of the plurality of steps when the load current flows from the load to the three-phase AC power supply as Td1+Tdf=Td2'+Td3' (Td1, Td2', Td3', and Tdf>0).

6. The power conversion device according to claim 3, wherein a PWM time width corresponding to a voltage drop of the forward and backward switches is Tdf, and wherein the commutation device sets the times between each of the plurality of steps as Td1=Td3' (Td1 and Td3'>0) and Td2=Td2'=Tdf(Td2, Td2', and Tdf>0).

7. A power conversion device that receives a three-phase AC power supply as an input and controls an output voltage in accordance with a voltage command by PWM control so as to supply power to a load including a motor, the power conversion device comprising:

a main circuit section including
forward and backward switches connecting each phase of the three-phase AC power supply to each output phase connected to the load,
an LC filter having a reactor and a capacitor and being connected between the three-phase AC power supply and each of the forward and backward switches, and
a current detector detecting an input current or a load current; and a four-step commutation device generating a plurality of steps on a basis of an interphase voltage of the three-phase AC power supply, the plurality of steps including:
a step A in which a switch at a commutation destination among the forward and backward switches to be backward biased by the interphase voltage is turned on,
a step B in which a switch at a commutation source among the forward and backward switches to be forward biased by the interphase voltage is turned off,
a step C in which a switch at the commutation destination among the forward and backward switches to be forward biased by the interphase voltage is turned on, and a step D in which a switch at the commutation source among the forward and backward switches to be backward biased by the interphase voltage is turned off, wherein the four-step commutation device performs commutation in a sequence of the step A, the step B, the step C, and the step D, wherein times between each of the plurality of steps during a half PWM cycle for commutation from a high potential power supply phase to a low potential power supply phase are set to Td1, Td2, and Td3 in sequence, wherein times between each of the plurality of steps during a half PWM cycle for commutation from the low potential power supply phase to the high potential power supply phase are set to Td3', Td2', and Td1' in sequence, and wherein at least of one of Td1, Td2, Td3' and Td2' is differently set between when the load current flows from the three-phase AC power supply to the load and when the load current flows from the load to the three-phase AC power supply.

8. The power conversion device according to claim 7, wherein Td1 and Td3' are differently set between when the load current flows from the three-phase AC power supply to the load and when the load current flows from the load to the three-phase AC power supply.

9. The power conversion device according to claim 7, wherein the times between each of the plurality of steps when the load current flows from the three-phase AC power supply to the load are set as Td1=Td2'+Td3' (Td1>0, Td2'>0, and Td3'>0), and wherein the times between each of the plurality of steps when the load current flows from the load to the three-phase AC power supply are set as Td1+Td2=Td3' (Td1>0, Td2>0, and Td3'>0).

10. The power conversion device according to claim 9, wherein the commutation device changes Td1 and Td3' during a half PWM cycle.

11. The power conversion device according to claim 9, wherein a PWM time width corresponding to a voltage drop of the forward and backward switches is Tdf, wherein the commutation device sets the times between each of the plurality of steps when the load current flows from the three-phase AC power supply to the load as Td1=Td2'+Td3'+Tdf(Td1, Td2', Td3', and Tdf>0), and wherein the commutation device sets the times between each of the plurality of steps when the load current flows from the load to the three-phase AC power supply as Td1+Td2+Tdf=Td3' (Td1, Td2, Td3', and Tdf>0).

12. A power conversion device that receives a three-phase AC power supply as an input and controls an output voltage in accordance with a voltage command by PWM control so as to supply power to a load including a motor, the power conversion device comprising:

a main circuit section including:
forward and backward switches connecting each phase of the three-phase AC power supply to each output phase connected to the load,
an LC filter having a reactor and a capacitor and being connected between the three-phase AC power supply and each of the forward and backward switches, and
a current detector detecting an input current or a load current;

a first four-step commutation device generating a first plurality of steps on a basis of an interphase voltage of the three-phase AC power supply, the first plurality of steps including:

a step A in which a switch at a commutation destination among the forward and backward switches to be backward biased by the interphase voltage is turned on, a step B in which a switch at a commutation source among the forward and backward switches to be forward biased by the interphase voltage is turned off, a step C in which a switch at the commutation destination among the forward and backward switches to be forward biased by the interphase voltage is turned on, and a step D in which a switch at the commutation source among the forward and backward switches to be backward biased by the interphase voltage is turned off; and a second four-step commutation device generating a second plurality of steps on a basis of a polarity of the load current, the second plurality of steps including:

a step 1 in which a switch at the commutation source among the forward and backward switches having a polarity opposite to the polarity of the load current is turned off, a step 2 in which a switch at the commutation destination among the forward and backward switches having a polarity same as the polarity of the load current is turned on, a step 3 in which a switch at the commutation source among the forward and backward switches having a polarity same as the polarity of the load current is turned off, and step 4 in which a switch at the commutation destination among the forward and backward switches having a polarity opposite to the polarity of the load current is turned on, wherein the first four-step commutation device performs commutation in a sequence of the step A, the step B, the step C, and the step D, wherein the second four-step commutation device performs commutation in a sequence of the step 1, the step 2, the step 3, and the step 4, and wherein the first four-step commutation device and the second four-step commutation device are switched to each other in a half PWM cycle.

* * * * *